US012548198B2

(12) United States Patent
Cao et al.

(10) Patent No.: US 12,548,198 B2
(45) Date of Patent: Feb. 10, 2026

(54) MOTION ESTIMATION IN GEOMETRY POINT CLOUD COMPRESSION

(71) Applicant: QUALCOMM Incorporated, San Diego, CA (US)

(72) Inventors: Keming Cao, San Diego, CA (US); Adarsh Krishnan Ramasubramonian, Irvine, CA (US); Geert Van der Auwera, Del Mar, CA (US); John Steven Lima, San Diego, CA (US); Christopher Brunner, San Diego, CA (US); Marta Karczewicz, San Diego, CA (US); Bappaditya Ray, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 650 days.

(21) Appl. No.: 17/495,428

(22) Filed: Oct. 6, 2021

(65) Prior Publication Data
US 2022/0108487 A1   Apr. 7, 2022

Related U.S. Application Data

(60) Provisional application No. 63/090,657, filed on Oct. 12, 2020, provisional application No. 63/090,627, (Continued)

(51) Int. Cl.
*G06K 9/36* (2006.01)
*G01S 17/89* (2020.01)
(Continued)

(52) U.S. Cl.
CPC .............. *G06T 9/001* (2013.01); *G01S 17/89* (2013.01); *G06T 7/248* (2017.01); *G06T 9/004* (2013.01);
(Continued)

(58) Field of Classification Search
None
See application file for complete search history.

(56) References Cited

U.S. PATENT DOCUMENTS 7,086,955 B2 * 8/2006 Gobush .............. A63B 24/0021
                                                    473/409
7,720,154 B2 * 5/2010 Zhou ...................... H04N 5/145
                                                    375/240.12
(Continued)

FOREIGN PATENT DOCUMENTS

CN        104159106 A  * 11/2014
CN        110658531 A    1/2020
(Continued)

OTHER PUBLICATIONS

Graziosi et al., "An overview of ongoing point cloud compression standardization activities: Video-based (V-PCC) and geometry-based (G-PCC)." APSIPA Transactions on Signal and Information Processing 9 (2020): e13. (Year: 2020).*
(Continued)

*Primary Examiner* — Feng Niu
(74) *Attorney, Agent, or Firm* — Shumaker & Sieffert, P. A.

(57) ABSTRACT

A device for encoding point cloud data, the device comprising: a memory to store the point cloud data; and one or more processors coupled to the memory and implemented in circuitry, the one or more processors configured to identify a first set of global motion parameters from global positioning system information. The one or more processors are further configured to determine, based on the first set of global motion parameters, a second set of global motion parameters to be used for global motion estimation for a current frame and apply, based on the second set of global motion parameters, motion compensation to a reference
(Continued)

frame to generate a global motion compensated frame for the current frame.

42 Claims, 10 Drawing Sheets

Related U.S. Application Data filed on Oct. 12, 2020, provisional application No. 63/088,936, filed on Oct. 7, 2020.

(51) Int. Cl.

| | | |
|---|---|---|
| *G06K 9/46* | (2006.01) | |
| *G06T 7/246* | (2017.01) | |
| *G06T 9/00* | (2006.01) | |
| *G06T 9/40* | (2006.01) | |
| *H04N 19/105* | (2014.01) | |
| *H04N 19/527* | (2014.01) | |
| *H04N 19/54* | (2014.01) | |
| *H04N 19/56* | (2014.01) | |
| *H04N 19/597* | (2014.01) | |
| *H04N 19/70* | (2014.01) | |
| *H04N 19/96* | (2014.01) | |

(52) U.S. Cl.
CPC ............ *G06T 9/40* (2013.01); *H04N 19/105* (2014.11); *H04N 19/527* (2014.11); *H04N 19/54* (2014.11); *H04N 19/56* (2014.11); *H04N 19/597* (2014.11); *H04N 19/70* (2014.11); *H04N 19/96* (2014.11); *G06T 2207/10028* (2013.01)

(56) References Cited

U.S. PATENT DOCUMENTS

| | | | | |
|---|---|---|---|---|
| 8,154,594 B2 * | 4/2012 | Seki | ............ | G06V 20/58 |
| | | | | 348/43 |
| 9,204,147 B2 * | 12/2015 | Takehara | ............ | H04N 19/57 |
| 9,516,314 B2 * | 12/2016 | Takehara | ............ | H04N 19/176 |
| 9,538,184 B2 * | 1/2017 | Alshina | ............ | H04N 19/146 |
| 9,645,250 B2 * | 5/2017 | Zeng | ............ | G01S 19/42 |
| 9,810,549 B2 * | 11/2017 | Johnson | ............ | G01C 25/005 |
| 9,930,355 B2 * | 3/2018 | Sekiguchi | ............ | H04N 19/52 |
| 10,032,069 B2 * | 7/2018 | Mizuochi | ............ | G06V 40/23 |
| 10,063,860 B2 * | 8/2018 | Fukushima | ............ | H04N 19/52 |
| 10,701,389 B2 * | 6/2020 | Takehara | ............ | H04N 19/503 |
| 10,705,219 B2 * | 7/2020 | Yi | ............ | G01S 7/003 |
| 11,069,082 B1 * | 7/2021 | Ebrahimi Afrouzi | .. | H04N 23/56 |
| 11,274,929 B1 * | 3/2022 | Afrouzi | ............ | G06T 7/62 |
| 11,381,834 B2 * | 7/2022 | Chuang | ............ | H04N 19/533 |
| 11,394,979 B2 * | 7/2022 | Oh | ............ | H04N 21/440245 |
| 11,461,932 B2 * | 10/2022 | Gao | ............ | G01S 17/89 |
| 11,620,767 B2 * | 4/2023 | Lasserre | ............ | G06T 9/005 |
| | | | | 382/232 |
| 11,902,576 B2 * | 2/2024 | Sugio | ............ | G06T 9/40 |
| 11,949,909 B2 * | 4/2024 | Pham Van | ............ | H04N 19/177 |
| 2004/0248662 A1 * | 12/2004 | Gobush | ............ | G01S 11/12 |
| | | | | 473/199 |
| 2005/0063468 A1 * | 3/2005 | Shimizu | ............ | H04N 19/57 |
| | | | | 375/E7.122 |
| 2006/0104359 A1 * | 5/2006 | Zhou | ............ | H04N 5/145 |
| | | | | 348/E5.066 |
| 2006/0281572 A1 * | 12/2006 | Gobush | ............ | A63B 24/0003 |
| | | | | 473/131 |
| 2008/0043842 A1 * | 2/2008 | Nakaishi | ............ | H04N 19/137 |
| | | | | 375/E7.262 |
| 2008/0043843 A1 * | 2/2008 | Nakaishi | ............ | H04N 19/43 |
| | | | | 375/E7.101 |
| 2009/0167844 A1 * | 7/2009 | Seki | ............ | G06T 7/74 |
| | | | | 348/47 |
| 2011/0051812 A1 * | 3/2011 | Tanaka | ............ | H04N 19/61 |
| | | | | 375/E7.243 |
| 2012/0203487 A1 * | 8/2012 | Johnson | ............ | G01C 25/005 |
| | | | | 702/141 |
| 2012/0221244 A1 * | 8/2012 | Georgy | ............ | G01S 19/47 |
| | | | | 701/472 |
| 2012/0245839 A1 * | 9/2012 | Syed | ............ | G01C 25/005 |
| | | | | 702/150 |
| 2013/0082874 A1 * | 4/2013 | Zhang | ............ | G01S 19/48 |
| | | | | 340/936 |
| 2013/0195188 A1 * | 8/2013 | Sugio | ............ | H04N 19/463 |
| | | | | 375/240.14 |
| 2014/0044171 A1 * | 2/2014 | Takehara | ............ | H04N 19/52 |
| | | | | 375/240.14 |
| 2014/0105302 A1 * | 4/2014 | Takehara | ............ | H04N 19/521 |
| | | | | 375/240.15 |
| 2014/0233634 A1 * | 8/2014 | Alshina | ............ | H04N 19/503 |
| | | | | 375/240.02 |
| 2014/0321547 A1 * | 10/2014 | Takehara | ............ | H04N 19/159 |
| | | | | 375/240.16 |
| 2014/0355686 A1 * | 12/2014 | Takehara | ............ | H04N 19/503 |
| | | | | 375/240.16 |
| 2014/0355687 A1 * | 12/2014 | Takehara | ............ | H04N 19/513 |
| | | | | 375/240.16 |
| 2014/0372026 A1 * | 12/2014 | Georgy | ............ | G01S 19/47 |
| | | | | 701/469 |
| 2014/0376614 A1 * | 12/2014 | Fukushima | ............ | H04N 19/176 |
| | | | | 375/240.02 |
| 2016/0030804 A1 * | 2/2016 | Mizuochi | ............ | A61B 5/11 |
| | | | | 482/8 |
| 2016/0299234 A1 * | 10/2016 | Zeng | ............ | G01S 19/42 |
| 2017/0345166 A1 * | 11/2017 | Polle | ............ | G06T 7/277 |
| 2018/0084260 A1 * | 3/2018 | Chien | ............ | H04N 19/52 |
| 2018/0299557 A1 * | 10/2018 | Yi | ............ | G01S 17/89 |
| 2018/0348249 A1 * | 12/2018 | Kawamoto | ............ | G01P 3/685 |
| 2019/0003836 A1 * | 1/2019 | Zhang | ............ | G01C 21/3848 |
| 2019/0045213 A1 * | 2/2019 | Raut | ............ | H04N 19/573 |
| 2019/0186948 A1 * | 6/2019 | Hayee | ............ | B60Q 9/00 |
| 2019/0346271 A1 * | 11/2019 | Zhang | ............ | G05D 1/245 |
| 2020/0005490 A1 * | 1/2020 | Paik | ............ | G06T 7/80 |
| 2020/0213622 A1 * | 7/2020 | Xu | ............ | H04N 19/44 |
| 2020/0296383 A1 * | 9/2020 | Li | ............ | H04N 19/52 |
| 2020/0304823 A1 | 9/2020 | Yea et al. | | |
| 2020/0372673 A1 * | 11/2020 | Lyer | ............ | G06T 7/337 |
| 2020/0394822 A1 * | 12/2020 | Gao | ............ | G06T 9/001 |
| 2020/0401959 A1 * | 12/2020 | Lee | ............ | G08G 1/202 |
| 2021/0160527 A1 * | 5/2021 | Chuang | ............ | H04N 19/513 |
| 2021/0227232 A1 * | 7/2021 | Oh | ............ | H04N 21/42201 |
| 2021/0233315 A1 * | 7/2021 | Jung | ............ | G06V 20/20 |
| 2021/0312669 A1 * | 10/2021 | Sugio | ............ | G06F 18/2431 |
| 2021/0409767 A1 * | 12/2021 | Oh | ............ | H04N 21/85406 |
| 2022/0210466 A1 * | 6/2022 | Pham Van | ............ | H04N 19/124 |
| 2022/0281329 A1 * | 9/2022 | Cho | ............ | B60L 53/32 |
| 2022/0413150 A1 * | 12/2022 | Kato | ............ | G08G 1/09626 |
| 2023/0003521 A1 * | 1/2023 | Kato | ............ | G01S 7/4808 |
| 2023/0010175 A1 * | 1/2023 | Kato | ............ | G01S 17/931 |
| 2023/0018907 A1 * | 1/2023 | Pham Van | ............ | G06T 9/004 |
| 2023/0257000 A1 * | 8/2023 | Beltran De La Cita | ............ | |
| | | | | B60W 60/0016 |
| | | | | 701/301 |

FOREIGN PATENT DOCUMENTS

| | | | | |
|---|---|---|---|---|
| EP | 1783683 A1 * | 5/2007 | ............ | B60R 1/00 |
| JP | 2019145089 A | 8/2019 | | |
| JP | 2022516232 A | 2/2022 | | |
| KR | 101660031 B1 * | 9/2016 | ............ | H04N 19/119 |
| TW | 201717646 A * | 5/2017 | | |

OTHER PUBLICATIONS

Liu et al., "A comprehensive study and comparison of core technologies for MPEG 3-D point cloud compression." IEEE Transactions on Broadcasting 66, No. 3 (2019): 701-717. (Year: 2019).*
Lasserre et al., "Using neighbouring nodes for the compression of octrees representing the geometry of point clouds." In Proceedings

(56) References Cited

OTHER PUBLICATIONS of the 10th ACM Multimedia Systems Conference, pp. 145-153. 2019. (Year: 2019).*
Lasserre et al., "Point Cloud Compression, MPEG and beyond", ERC-CLIM Workshop, Inria, Rennes, May 28, 2019, downloaded from http://clim.inria.fr/workshop/LasserrePCC.pdf. (Year: 2019).*
Kaniewski et al., "Algorithms of position and velocity estimation in GPS receivers." Annual of Navigation 23 (2016): 53-68. (Year: 2016).*
Global Positioning System—Wikipedia (Year: 2020).*
Rotation matrix—Wikipedia (Year: 2020).*
EP-1783683-A1 (machine translation) (Year: 2007).*
TW-201717646-A (machine translation) (Year: 2017).*
KR-101660031-B1 (machine translation) (Year: 2016).*
CN-104159106-A (Year: 2014).*
Cao, "3D point cloud compression." Ph.D. thesis, Dec. 14, 2021 (Year: 2021).*
Tu et al., "Real-Time Streaming Point Cloud Compression for 3D LiDAR Sensor Using U-Net," in IEEE Access, vol. 7, pp. 113616-113625, 2019 (Year: 2019).*
Mekuria et al., "Design, implementation, and evaluation of a point cloud codec for tele-immersive video." IEEE Transactions on Circuits and Systems for Video Technology 27, No. 4 (2016): 828-842. (Year: 2016).*
Meuel et al., "Low bit rate ROI based video coding for HDTV aerial surveillance video sequences," CVPR 2011 Workshops, Colorado Springs, CO, USA, 2011, pp. 13-20 (Year: 2011).*
Zhang et al., "Visual odometry based on Random Finite Set Statistics in urban environment," 2012 IEEE Intelligent Vehicles Symposium, Madrid, Spain, 2012, pp. 69-74 (Year: 2012).*
3DG: "G-PCC Codec Description v6", Coding of Moving Pictures and Audio, ISO/IEC JTC1/SC29/WG11, N19091, Jan. 2020, Brussels, BE, Mar. 27, 2020, 92 pages.
Asserre (Blackberry) S., et al., "[PCC] Global Motion Compensation for Point Cloud Compression in TMC3", 124. MPEG, Meeting, Oct. 8, 2018-Oct. 12, 2018, Macao, (Motion Picture Expert Group or Iso/Iec JTC1/SC29/WG11), No. M44751, Oct. 3, 2018 (Oct. 3, 2018), XP030192062, 26 Pages.
"Text of ISO/IEC 23090-9 DIS Geometry-Based Point Cloud Compression", 129. MPEG Meeting, Jan. 13, 2020 -Jan. 17, 2020, Brussels, (Motion Picture Expert Group or ISO/IEC JTC1/SC29/WG11), No. n19088, Apr. 20, 2020 (Apr. 20, 2020), XP030287970, 126 Pages, Retrieved from the Internet: URL:http://phenix.int-evry.fr/mpeg/doc_end_user/documents/129_Brussels/wg11/w19088.zip w19088_d10_clean.pdf [retrieved on-Apr. 20, 2020].
Van L.P., (Qualcomm) et al., "[G-PCC] [EE13.2-related] [New Proposal] Improved Global Motion Estimation for G-PCC", 133. MPEG Meeting, Jan. 11, 2021 -Jan. 15, 2021, Online, (Motion Picture Expert Group or ISO/IEC JTC1/SC29/WG11), No. M56113, Jan. 6, 2021, XP030291071, 10 Pages.
ITU-T H.265: "Series H: Audiovisual and Multimedia Systems, Infrastructure of Audiovisual Services—Coding of Moving Video, High Efficiency Video Coding", The International Telecommunication Union, Jun. 2019, 696 Pages.
Wikipedia: "Earth-Centered, Earth-Fixed Coordinate System", https://en.wikipedia.org/wiki/Earth-centered,_Earth-fixed_coordinate_system, Retrieved on Nov. 16, 2021, pp. 1-3.
Wikipedia: "Geodetic Datum", https://en.wikipedia.org/wiki/Geodetic_datum, Retrieved on Nov. 16, 2021, pp. 1-10.
International Search Report and Written Opinion—PCT/US2021/053994—ISA/EPO—Feb. 11, 2022.
Sebastian S., et al., "Emerging MPEG Standards for Point Cloud Compression", IEEE Journal on Emerging and Selected Topics in Circuits and Syatems, IEEE, Piscataway, NJ, USA, vol. 9, No. 1, Mar. 30, 2019 (Mar. 30, 2019), pp. 133-148, XP011714044, ISSN: 2156-3357, DOI: 10.1109/JETCAS.2018.2885981, Retrieved from the Internet: URL: https://ieeexplore.ieee.org/abstract/document/8571288 Sections II-VII and IX.

\* cited by examiner

MOTION ESTIMATION IN GEOMETRY POINT CLOUD COMPRESSION

This application claims the benefit of U.S. Provisional Patent Application No. 63/090,657, filed 12 Oct. 2020, U.S. Provisional Patent Application No. 63/090,627, filed 12 Oct. 2020, and U.S. Provisional Patent Application No. 63/088,936, filed 7 Oct. 2020, the entire content of each application is incorporated herein by reference.

TECHNICAL FIELD

This disclosure relates to point cloud encoding and decoding.

BACKGROUND

A point cloud is a collection of points in a 3-dimensional space. The points may correspond to points on objects within the 3-dimensional space. Thus, a point cloud may be used to represent the physical content of the 3-dimensional space. Point clouds may have utility in a wide variety of situations. For example, point clouds may be used in the context of autonomous vehicles for representing the positions of objects on a roadway. In another example, point clouds may be used in the context of representing the physical content of an environment for purposes of positioning virtual objects in an augmented reality (AR) or mixed reality (MR) application. Point cloud compression is a process for encoding and decoding point clouds. Encoding point clouds may reduce the amount of data required for storage and transmission of point clouds.

SUMMARY

In general, this disclosure describes techniques for improving the visualization of point cloud frames that may use a geometry-based point cloud compression (G-PCC) codec that is being developed within MPEG by the 3D Graphics Coding (3DG) group. A G-PCC coder (e.g., a G-PCC encoder or a G-PCC decoder) may be configured to apply motion compensation to a reference frame to generate a motion compensated frame. For example, a G-PCC encoder may apply "global" motion compensation to the reference frame (e.g., a predicted frame) to account for a rotation of the entire reference frame and/or a translation of the entire reference frame. In this example, the G-PCC encoder may apply "local" motion estimation to account for a rotation and/or translation at a finer scale than the global motion compensation. For instance, the G-PCC encoder may apply local node motion estimation of one or more nodes (e.g., a portion of the frame) of a global motion compensated frame.

In accordance with the techniques of the disclosure, a G-PCC coder (e.g., a G-PCC encoder or a G-PCC decoder) may be configured to apply global motion compensation based on global positioning system information (e.g., information from any satellite system, such as, for example, the global positioning system (GPS) implemented in the Unites States). For example, a G-PCC encoder may identify a first set of global motion parameters form the global positioning system information. The first set of global motion parameters may include orientation parameters (e.g., a roll, pitch, yaw, or angular velocity) and/or position parameters (e.g., a displacement or velocity along an x, y, or z dimension). In this example, the G-PCC encoder may determine a second set of global motion parameters based on the first set of global motion parameters. For example, the G-PCC encoder may convert the orientation parameters and/or the position parameters into a rotational matrix and a translation vector for a current frame. In this way, the G-PCC coder (e.g., a G-PCC encoder or a G-PCC decoder) may apply global motion compensation using satellite information, which may be more accurate than estimating the rotational matrix and translation vector for the current frame based on feature points between a reference frame (e.g., a prediction frame) and the current frame. Increasing the accuracy of the motion compensation may increase an accuracy of a motion compensated predicted frame, which may reduce a residual encoded for the current frame to increase a coding efficiency.

In one example, this disclosure describes a device for encoding point cloud data, the device comprising a memory to store the point cloud data and one or more processors coupled to the memory and implemented in circuitry. The one or more processors are configured to identify a first set of global motion parameters from global positioning system information. The one or more processors are further configured to determine, based on the first set of global motion parameters, a second set of global motion parameters to be used for global motion estimation for a current frame and apply, based on the second set of global motion parameters, motion compensation to a reference frame to generate a global motion compensated frame for the current frame.

In another example, this disclosure describes a method for encoding point cloud data comprising identifying, with one or more processors, a first set of global motion parameters from global positioning system information and determining, with one or more processors, based on the first set of global motion parameters, a second set of global motion parameters to be used for global motion estimation for a current frame. The method further includes applying, with one or more processors, based on the second set of global motion parameters, motion compensation to a reference frame to generate a global motion compensated frame for the current frame.

In another example, this disclosure describes a computer-readable storage medium storing instructions, which when executed by one or more processors, cause the one or more processors to identify a first set of global motion parameters from global positioning system information and determine, based on the first set of global motion parameters, a second set of global motion parameters to be used for global motion estimation for a current frame. The instructions further cause the one or more processors to apply, based on the second set of global motion parameters, motion compensation to a reference frame to generate a global motion compensated frame for the current frame.

In another example, this disclosure describes a device for processing point cloud data, the device comprising at least one means for identifying a first set of global motion parameters from global positioning system information and means for determining, based on the first set of global motion parameters, a second set of global motion parameters to be used for global motion estimation for a current frame. The device further comprises means for apply, based on the second set of global motion parameters, motion compensation to a reference frame to generate a global motion compensated frame for the current frame.

The details of one or more examples are set forth in the accompanying drawings and the description below. Other features, objects, and advantages will be apparent from the description, drawings, and claims.

DETAILED DESCRIPTION

A geometry-based point cloud compression (G-PCC) coder (e.g., a G-PCC encoder or a G-PCC decoder) may be configured to apply motion compensation to a reference frame to generate a motion compensated frame. For example, a G-PCC encoder may apply "global" motion compensation to the reference frame to account for a rotation of the entire reference frame and/or a translation of the entire reference frame. In this example, the G-PCC encoder may apply "local" motion estimation to account for a rotation and/or translation at a finer scale than the global motion compensation. For instance, the G-PCC encoder may apply local node motion estimation of one or more nodes (e.g., a portion of the frame) of a global motion compensated frame.

Some systems may estimate a rotational matrix and a translation vector for a current frame based on feature points between a reference frame (e.g., a prediction frame) and the current frame. For example, a G-PCC encoder may estimate the motion matrix and the translation vector to force a "match" between respective feature points of the reference frame and current frame. However, the detected feature points may not be reliable, which may lead to incorrect estimations of the rotational matrix and/or the translation vector that may add distortion instead of compensating for global motion. This additional distortion may reduce coding efficiency of the G-PCC encoder and a G-PCC decoder using the rotational matrix and the translation vector.

In accordance with the techniques of the disclosure, a G-PCC encoder may be configured to apply global motion compensation based on global positioning system information. For example, the G-PCC encoder may identify a first set of global motion parameters. The first set of global motion parameters may include orientation parameters (e.g., a roll, pitch, yaw, or angular velocity) and/or position parameters (e.g., a displacement or velocity along an x, y, or z dimension). In this example, the G-PCC encoder may determine a second set of global motion parameters based on the first set of global motion parameters. For example, the G-PCC encoder may convert the orientation parameters and/or the position parameters into a rotational matrix and a translation vector for a current frame. In this way, the G-PCC coder (e.g., a G-PCC encoder or a G-PCC decoder) may apply global motion compensation using satellite information, which may be more accurate than estimating the rotational matrix and translation vector for the current frame based on feature points between a reference frame (e.g., a prediction frame) and the current frame. Increasing the accuracy of the motion compensation may increase an accuracy of a motion compensated predicted frame, which may reduce a residual encoded for the current frame to increase a coding efficiency.

Figure 1:
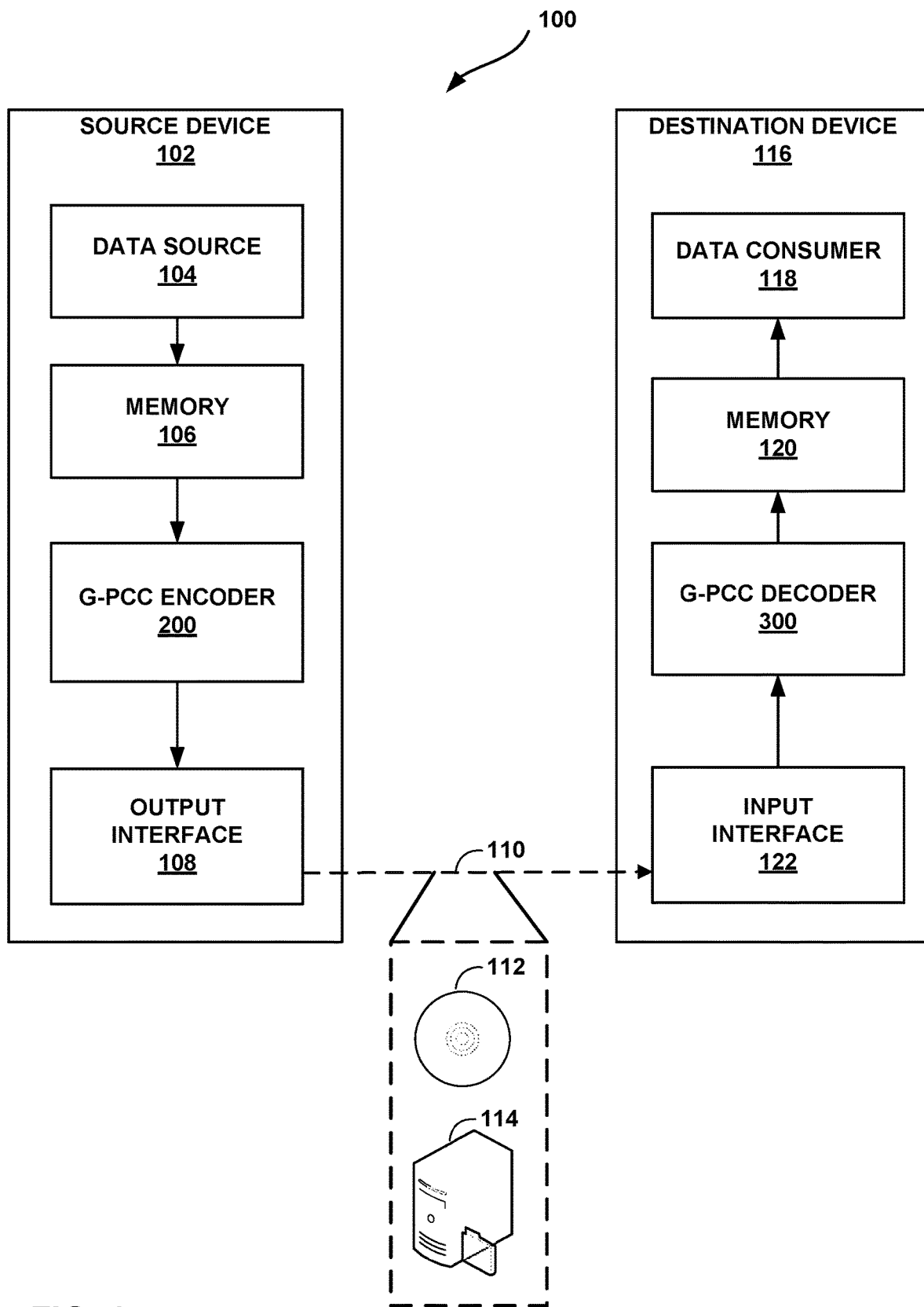
FIG. 1 is a block diagram illustrating an example encoding and decoding system that may perform the techniques of this disclosure.

FIG. 1 is a block diagram illustrating an example encoding and decoding system 100 that may perform the techniques of this disclosure. The techniques of this disclosure are generally directed to coding (encoding and/or decoding) point cloud data, i.e., to support point cloud compression. In general, point cloud data includes any data for processing a point cloud. The coding may be effective in compressing and/or decompressing point cloud data.

As shown in FIG. 1, system 100 includes a source device 102 and a destination device 116. Source device 102 provides encoded point cloud data to be decoded by a destination device 116. Particularly, in the example of FIG. 1, source device 102 provides the point cloud data to destination device 116 via a computer-readable medium 110. Source device 102 and destination device 116 may comprise any of a wide range of devices, including desktop computers, notebook (i.e., laptop) computers, tablet computers, set-top boxes, telephone handsets such as smartphones, televisions, cameras, display devices, digital media players, video gaming consoles, video streaming devices, terrestrial or marine vehicles, spacecraft, aircraft, robots, LIDAR devices, satellites, or the like. In some cases, source device 102 and destination device 116 may be equipped for wireless communication.

In the example of FIG. 1, source device 102 includes a data source 104, a memory 106, a G-PCC encoder 200, and an output interface 108. Destination device 116 includes an input interface 122, a G-PCC decoder 300, a memory 120, and a data consumer 118. In accordance with this disclosure, G-PCC encoder 200 of source device 102 and G-PCC decoder 300 of destination device 116 may be configured to apply the techniques of this disclosure related to techniques for improving the visualization of point cloud frames. Thus, source device 102 represents an example of an encoding device, while destination device 116 represents an example of a decoding device. In other examples, source device 102 and destination device 116 may include other components or arrangements. For example, source device 102 may receive data (e.g., point cloud data) from an internal or external source. Likewise, destination device 116 may interface with an external data consumer, rather than include a data consumer in the same device.

System 100 as shown in FIG. 1 is merely one example. In general, other digital encoding and/or decoding devices may perform the techniques for improving the visualization of point cloud frames. Source device 102 and destination device 116 are merely examples of such devices in which source device 102 generates coded data for transmission to destination device 116. This disclosure refers to a "coding" device as a device that performs coding (encoding and/or decoding) of data. Thus, G-PCC encoder 200 and G-PCC decoder 300 represent examples of coding devices, in particular, an encoder and a decoder, respectively. In some examples, source device 102 and destination device 116 may operate in a substantially symmetrical manner such that each of source device 102 and destination device 116 includes encoding and decoding components. Hence, system 100 may support one-way or two-way transmission between source device 102 and destination device 116, e.g., for streaming, playback, broadcasting, telephony, navigation, and other applications.

In general, data source 104 represents a source of data (i.e., raw, unencoded point cloud data) and may provide a sequential series of "frames") of the data to G-PCC encoder 200, which encodes data for the frames. Data source 104 of source device 102 may include a point cloud capture device, such as any of a variety of cameras or sensors, e.g., a 3D scanner or a light detection and ranging (LIDAR) device, one or more video cameras, an archive containing previously captured data, and/or a data feed interface to receive data from a data content provider. Alternatively or additionally, point cloud data may be computer-generated from scanner, camera, sensor or other data. For example, data source 104 may generate computer graphics-based data as the source data, or produce a combination of live data, archived data, and computer-generated data. That is, data source 104 may generate the point cloud data. In each case, G-PCC encoder 200 encodes the captured, pre-captured, or computer-generated data. G-PCC encoder 200 may rearrange the frames from the received order (sometimes referred to as "display order") into a coding order for coding. G-PCC encoder 200 may generate one or more bitstreams including encoded data. Source device 102 may then output the encoded data via output interface 108 onto computer-readable medium 110 for reception and/or retrieval by, e.g., input interface 122 of destination device 116.

Memory 106 of source device 102 and memory 120 of destination device 116 may represent general purpose memories. In some examples, memory 106 and memory 120 may store raw data, e.g., raw data from data source 104 and raw, decoded data from G-PCC decoder 300. Additionally or alternatively, memory 106 and memory 120 may store software instructions executable by, e.g., G-PCC encoder 200 and G-PCC decoder 300, respectively. Although memory 106 and memory 120 are shown separately from G-PCC encoder 200 and G-PCC decoder 300 in this example, it should be understood that G-PCC encoder 200 and G-PCC decoder 300 may also include internal memories for functionally similar or equivalent purposes. Furthermore, memory 106 and memory 120 may store encoded data, e.g., output from G-PCC encoder 200 and input to G-PCC decoder 300. In some examples, portions of memory 106 and memory 120 may be allocated as one or more buffers, e.g., to store raw, decoded, and/or encoded data. For instance, memory 106 and memory 120 may store data representing a point cloud.

Computer-readable medium 110 may represent any type of medium or device capable of transporting the encoded data from source device 102 to destination device 116. In one example, computer-readable medium 110 represents a communication medium to enable source device 102 to transmit encoded data directly to destination device 116 in real-time, e.g., via a radio frequency network or computer-based network. Output interface 108 may modulate a transmission signal including the encoded data, and input interface 122 may demodulate the received transmission signal, according to a communication standard, such as a wireless communication protocol. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device 102 to destination device 116.

In some examples, source device 102 may output encoded data from output interface 108 to storage device 112. Similarly, destination device 116 may access encoded data from storage device 112 via input interface 122. Storage device 112 may include any of a variety of distributed or locally accessed data storage media such as a hard drive, Blu-ray discs, DVDs, CD-ROMs, flash memory, volatile or non-volatile memory, or any other suitable digital storage media for storing encoded data.

In some examples, source device 102 may output encoded data to file server 114 or another intermediate storage device that may store the encoded data generated by source device 102. Destination device 116 may access stored data from file server 114 via streaming or download. File server 114 may be any type of server device capable of storing encoded data and transmitting that encoded data to the destination device 116. File server 114 may represent a web server (e.g., for a website), a File Transfer Protocol (FTP) server, a content delivery network device, or a network attached storage (NAS) device. Destination device 116 may access encoded data from file server 114 through any standard data connection, including an Internet connection. This may include a wireless channel (e.g., a Wi-Fi connection), a wired connection (e.g., digital subscriber line (DSL), cable modem, etc.), or a combination of both that is suitable for accessing encoded data stored on file server 114. File server 114 and input interface 122 may be configured to operate according to a streaming transmission protocol, a download transmission protocol, or a combination thereof.

Output interface 108 and input interface 122 may represent wireless transmitters/receivers, modems, wired networking components (e.g., Ethernet cards), wireless communication components that operate according to any of a variety of IEEE 802.11 standards, or other physical components. In examples where output interface 108 and input interface 122 comprise wireless components, output interface 108 and input interface 122 may be configured to transfer data, such as encoded data, according to a cellular communication standard, such as 4G, 4G-LTE (Long-Term Evolution), LTE Advanced, 5G, or the like. In some examples where output interface 108 comprises a wireless transmitter, output interface 108 and input interface 122 may be configured to transfer data, such as encoded data, according to other wireless standards, such as an IEEE 802.11 specification, an IEEE 802.15 specification (e.g., ZigBee™), a Bluetooth™ standard, or the like. In some examples, source device 102 and/or destination device 116 may include respective system-on-a-chip (SoC) devices. For example, source device 102 may include an SoC device to perform the functionality attributed to G-PCC encoder 200 and/or output interface 108, and destination device 116 may include an SoC device to perform the functionality attributed to G-PCC decoder 300 and/or input interface 122.

The techniques of this disclosure may be applied to encoding and decoding in support of any of a variety of applications, such as communication between autonomous vehicles, communication between scanners, cameras, sensors and processing devices such as local or remote servers, geographic mapping, or other applications.

Input interface 122 of destination device 116 receives an encoded bitstream from computer-readable medium 110 (e.g., a communication medium, storage device 112, file server 114, or the like). The encoded bitstream may include signaling information defined by G-PCC encoder 200, which is also used by G-PCC decoder 300, such as syntax elements having values that describe characteristics and/or processing of coded units (e.g., slices, pictures, groups of pictures, sequences, or the like). Data consumer 118 uses the decoded data. For example, data consumer 118 may use the decoded data to determine the locations of physical objects. In some examples, data consumer 118 may comprise a display to present imagery based on a point cloud.

G-PCC encoder 200 and G-PCC decoder 300 each may be implemented as any of a variety of suitable encoder and/or decoder circuitry, such as one or more microprocessors, digital signal processors (DSPs), application specific integrated circuits (ASICs), field programmable gate arrays (FPGAs), discrete logic, software, hardware, firmware or any combinations thereof. When the techniques are implemented partially in software, a device may store instructions for the software in a suitable, non-transitory computer-readable medium and execute the instructions in hardware using one or more processors to perform the techniques of this disclosure. Each of G-PCC encoder 200 and G-PCC decoder 300 may be included in one or more encoders or decoders, either of which may be integrated as part of a combined encoder/decoder (CODEC) in a respective device. A device including G-PCC encoder 200 and/or G-PCC decoder 300 may comprise one or more integrated circuits, microprocessors, and/or other types of devices.

G-PCC encoder 200 and G-PCC decoder 300 may operate according to a coding standard, such as video point cloud compression (V-PCC) standard or a geometry point cloud compression (G-PCC) standard. This disclosure may generally refer to coding (e.g., encoding and decoding) of pictures to include the process of encoding or decoding data. An encoded bitstream generally includes a series of values for syntax elements representative of coding decisions (e.g., coding modes).

This disclosure may generally refer to "signaling" certain information, such as syntax elements. The term "signaling" may generally refer to the communication of values for syntax elements and/or other data used to decode encoded data. That is, G-PCC encoder 200 may signal values for syntax elements in the bitstream. In general, signaling refers to generating a value in the bitstream. As noted above, source device 102 may transport the bitstream to destination device 116 substantially in real time, or not in real time, such as might occur when storing syntax elements to storage device 112 for later retrieval by destination device 116.

ISO/IEC MPEG (JTC 1/SC 29/WG 11) is studying the potential need for standardization of point cloud coding technology with a compression capability that significantly exceeds that of the current approaches and will target to create the standard. The group is working together on this exploration activity in a collaborative effort known as the 3-Dimensional Graphics Team (3DG) to evaluate compression technology designs proposed by their experts in this area.

Point cloud compression activities are categorized in two different approaches. The first approach is "Video point cloud compression" (V-PCC), which segments the 3D object, and project the segments in multiple 2D planes (which are represented as "patches" in the 2D frame), which are further coded by a legacy 2D video codec such as a High Efficiency Video Coding (HEVC) (ITU-T H.265) codec. The second approach is "Geometry-based point cloud compression" (G-PCC), which directly compresses 3D geometry i.e., position of a set of points in 3D space, and associated attribute values (for each point associated with the 3D geometry). G-PCC addresses the compression of point clouds in both Category 1 (static point clouds) and Category 3 (dynamically acquired point clouds). A recent draft of the G-PCC standard is available in G-PCC DIS, ISO/IEC JTC1/SC29/WG11 w19088, Brussels, Belgium, January 2020, and a description of the codec is available in G-PCC Codec Description v6, ISO/IEC JTC1/SC29/WG11 w19091, Brussels, Belgium, January 2020.

A point cloud contains a set of points in a 3D space, and may have attributes associated with the point. The attributes may be color information such as R, G, B or Y, Cb, Cr, or reflectance information, or other attributes. Point clouds may be captured by a variety of cameras or sensors such as LIDAR sensors and 3D scanners and may also be computer-generated. That is, source device 102 may generate the point cloud data based on signals from a LIDAR apparatus (e.g., a LIDAR sensor and/or a LIDAR device). Point cloud data are used in a variety of applications including, but not limited to, construction (modeling), graphics (3D models for visualizing and animation), and the automotive industry (LIDAR sensors used to help in navigation).

The 3D space occupied by a point cloud data may be enclosed by a virtual bounding box. The position of the points in the bounding box may be represented by a certain precision; therefore, the positions of one or more points may be quantized based on the precision. At the smallest level, the bounding box is split into voxels which are the smallest unit of space represented by a unit cube. A voxel in the bounding box may be associated with zero, one, or more than one point. The bounding box may be split into multiple cube/cuboid regions, which may be called tiles. Each tile may be coded into one or more slices. The partitioning of the bounding box into slices and tiles may be based on number of points in each partition, or based on other considerations (e.g., a particular region may be coded as tiles). The slice regions may be further partitioned using splitting decisions similar to those in video codecs.

In accordance with the techniques of the disclosure, G-PCC encoder 200 may be configured to apply global motion compensation based on global positioning system information. For example, G-PCC encoder 200 may identify a first set of global motion parameters. The first set of global motion parameters may include orientation parameters (e.g., a roll, pitch, yaw, or angular velocity) and/or position parameters (e.g., a displacement or velocity along an x, y, or z dimension). In this example, G-PCC encoder 200 may determine a second set of global motion parameters based on the first set of global motion parameters. For example, G-PCC encoder 200 may convert the orientation parameters and/or the position parameters into a rotational matrix and a translation vector for a current frame. In this way, G-PCC encoder 200 may apply global motion compensation using satellite information, which may be more accurate than estimating the rotational matrix and translation vector for the current frame based on feature points between a reference frame (e.g., a prediction frame) and the current frame.

G-PCC encoder 200 may signal the first set of global motion parameters (e.g., orientation parameters and/or position parameters). In some examples, G-PCC encoder 200 may signal a second set of global motion parameters (e.g., a rotational matrix and a translation vector for a current frame). While examples describe signaling a rotational matrix and a translation vector for a current frame to signal the second set of global motion parameters, in some examples, G-PCC encoder 200 may signal a portion and/or estimation of the rotational matrix and the translation vector for a current frame. For example, G-PCC encoder 200 may signal a difference of roll between the current frame and a frame of reference, a difference of pitch between the current frame and the frame of reference, a difference of yaw between the current frame and the frame of reference and a translation vector indicating an average velocity of the current frame. In some examples, G-PCC encoder 200 may signal the second set of global motion parameters to include a translation vector indicating only an average velocity of the current frame. In some examples, G-PCC encoder 200 may signal only the second set of global motion parameters to include only a magnitude of a translation vector indicating an average velocity of the current frame. In this way, G-PCC encoder 200 may apply global motion compensation using satellite information, which may be more accurate than estimating the rotational matrix and translation vector for the current frame based on feature points between a reference frame (e.g., a prediction frame) and the current frame. Increasing the accuracy of the motion compensation may increase an accuracy of a motion compensated predicted frame, which may reduce a residual encoded for the current frame to increase a coding efficiency.

Similarly, G-PCC decoder 300 may apply global motion compensation based on global positioning system information. For example, G-PCC decoder 300 may decode global motion information (e.g., the first set of global motion parameters and/or the second set of global motion parameters) from a bitstream. In this example, G-PCC decoder 300 may determine global motion for a current frame based on the global motion information. For example, G-PCC decoder 300 may apply global motion compensation based on a rotational matrix and a translation vector for a current frame.

G-PCC decoder 300 may decode the rotational matrix and translation vector directly from the bitstream or may estimate and/or derive the rotational matrix and translation vector from global motion information signaled in the bitstream. For example, G-PCC decoder 300 may decode, from a bitstream, a difference of roll between the current frame and a frame of reference, a difference of pitch between the current frame and the frame of reference, a difference of yaw between the current frame and the frame of reference and a translation vector indicating an average velocity of the current frame. In this example, G-PCC decoder 300 may determine the rotational matrix and the translation vector based on the difference of roll, the difference of pitch, the difference of yaw and the translation vector. In some examples, G-PCC decoder 300 may decode, from a bitstream, a translation vector and approximate the rotational matrix as an identity matrix. In some examples, G-PCC decoder 300 may decode, from a bitstream, a magnitude of a translation vector indicating an average velocity of the current frame and approximate the translation vector based on the received magnitude and approximate the rotational matrix as an identity matrix as a rotational matrix. In this way, G-PCC decoder 300 may apply global motion compensation using satellite information, which may be more accurate than estimating the rotational matrix and translation vector for the current frame based on feature points between a reference frame (e.g., a prediction frame) and the current frame. Increasing the accuracy of the motion compensation may increase an accuracy of a motion compensated predicted frame, which may reduce a residual encoded for the current frame to increase a coding efficiency.

Figure 2:
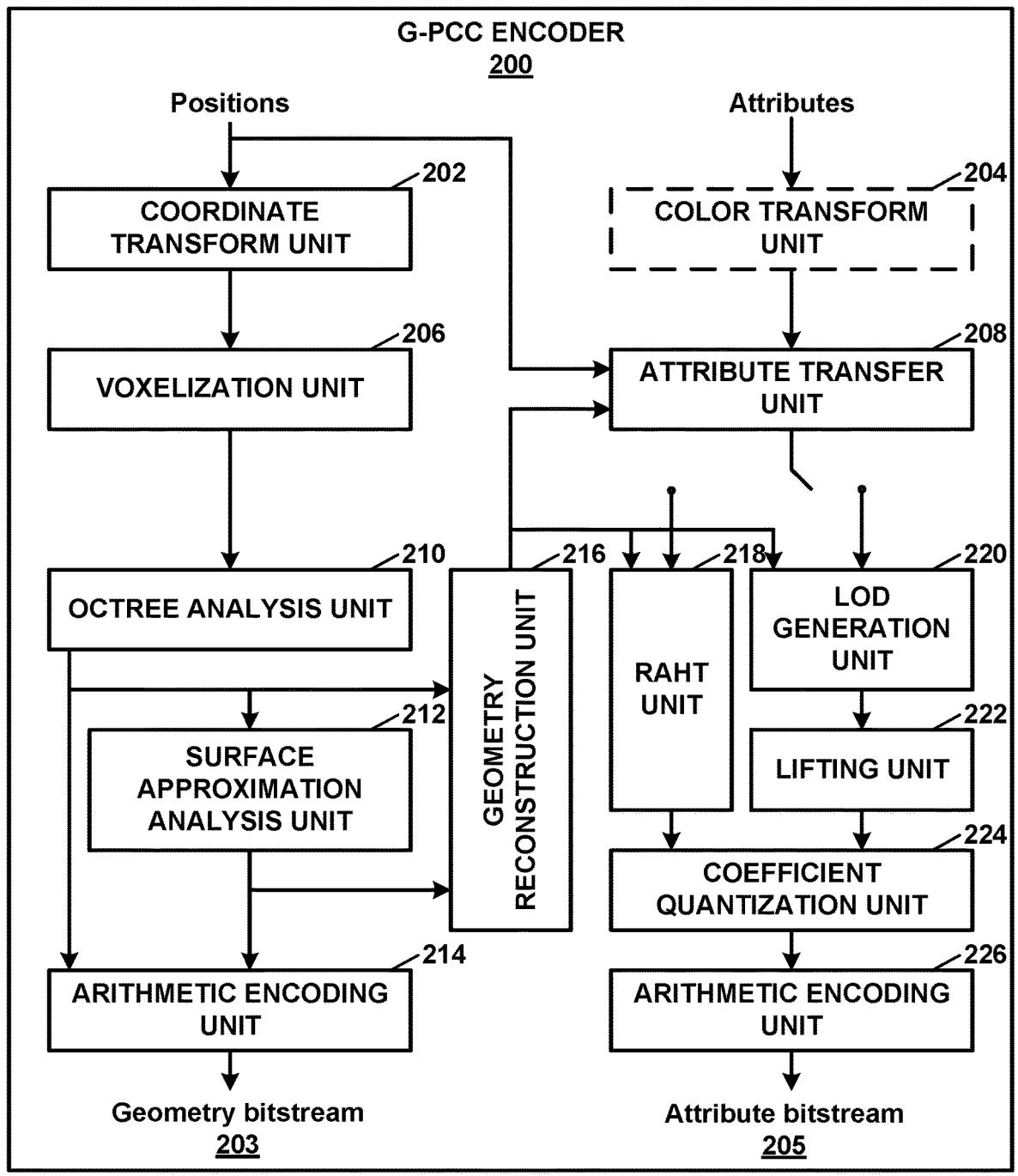
FIG. 2 is a block diagram illustrating an example Geometry Point Cloud Compression (G-PCC) encoder, in accordance with the techniques of the disclosure.
Figure 3:
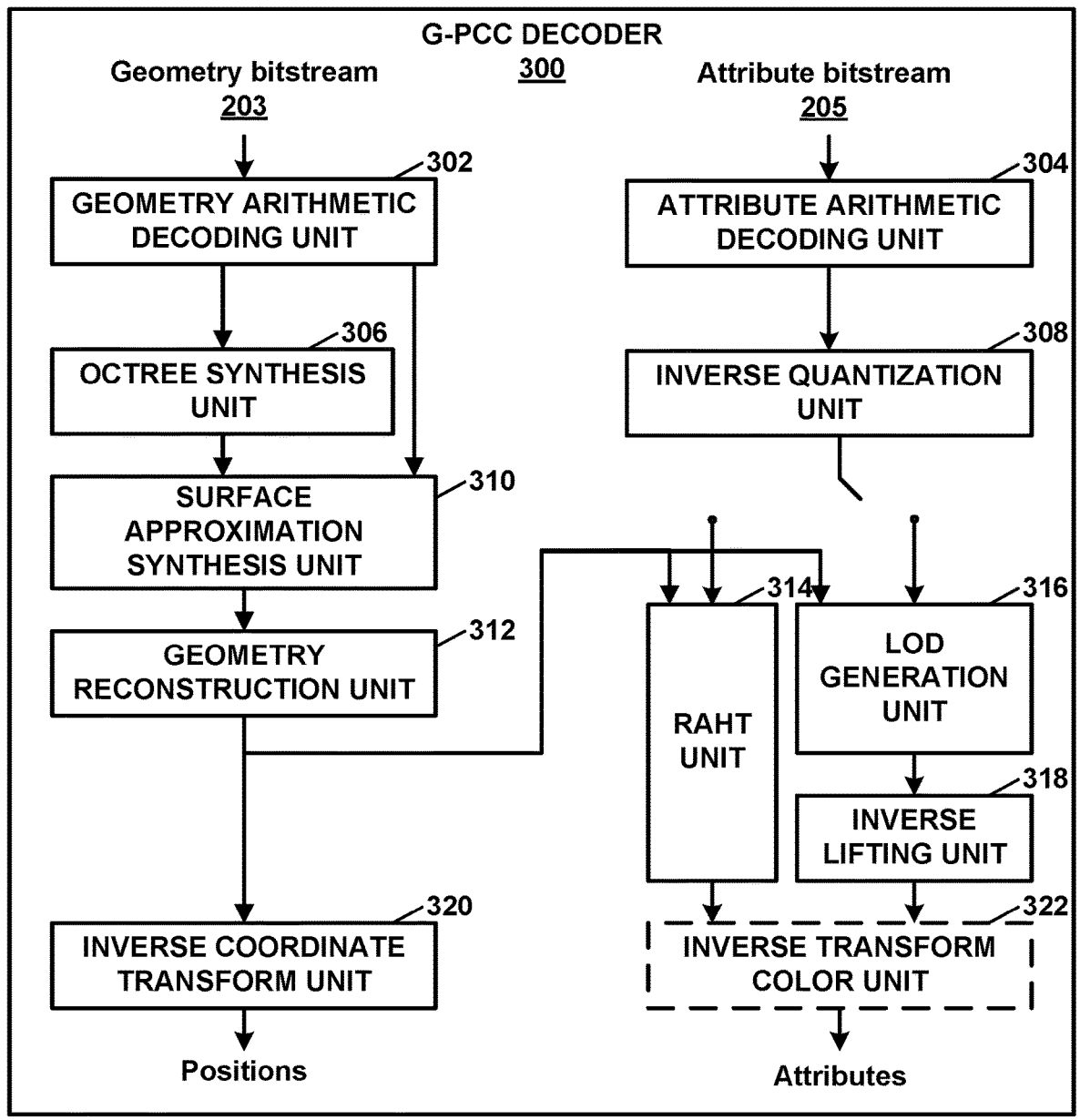
FIG. 3 is a block diagram illustrating an example G-PCC decoder, in accordance with the techniques of the disclosure.

FIG. 2 provides an overview of G-PCC encoder 200. FIG. 3 provides an overview of G-PCC decoder 300. The modules shown are logical, and do not necessarily correspond one-to-one to implemented code in the reference implementation of G-PCC codec, i.e., TMC13 test model software studied by ISO/IEC MPEG (JTC 1/SC 29/WG 11).

In both G-PCC encoder 200 and G-PCC decoder 300, point cloud positions are coded first. Attribute coding depends on the decoded geometry. In FIG. 2 and FIG. 3, the gray-shaded modules are options typically used for Category 1 data. Diagonal-crosshatched modules are options typically used for Category 3 data. All the other modules are common between Categories 1 and 3.

For Category 3 data, the compressed geometry is typically represented as an octree from the root all the way down to a leaf level of individual voxels. For Category 1 data, the compressed geometry is typically represented by a pruned octree (i.e., an octree from the root down to a leaf level of blocks larger than voxels) plus a model that approximates the surface within each leaf of the pruned octree. In this way, both Category 1 and 3 data share the octree coding mechanism, while Category 1 data may in addition approximate the voxels within each leaf with a surface model. The surface model used is a triangulation comprising 1-10 triangles per block, resulting in a triangle soup. The Category 1 geometry codec is therefore known as the Trisoup geometry codec, while the Category 3 geometry codec is known as the Octree geometry codec.

At each node of an octree, an occupancy is signaled (when not inferred) for one or more of its child nodes (up to eight nodes). Multiple neighborhoods are specified including (a) nodes that share a face with a current octree node, (b) nodes that share a face, edge, or a vertex with the current octree node, etc. Within each neighborhood, the occupancy of a node and/or its children may be used to predict the occupancy of the current node or its children. For points that are sparsely populated in certain nodes of the octree, the codec also supports a direct coding mode where the 3D position of the point is encoded directly. A flag may be signaled to indicate that a direct mode is signaled. At the lowest level, the number of points associated with the octree node/leaf node may also be coded.

Once the geometry is coded, the attributes corresponding to the geometry points are coded. When there are multiple attribute points corresponding to one reconstructed/decoded geometry point, an attribute value may be derived that is representative of the reconstructed point.

There are three attribute coding methods in G-PCC: Region Adaptive Hierarchical Transform (RAHT) coding, interpolation-based hierarchical nearest-neighbour prediction (Predicting Transform), and interpolation-based hierarchical nearest-neighbour prediction with an update/lifting step (Lifting Transform). RAHT and Lifting are typically used for Category 1 data, while predicting is typically used for Category 3 data. However, either method may be used for any data, and just like with the geometry codecs in G-PCC, the attribute coding method used to code the point cloud is specified in the bitstream.

The coding of the attributes may be conducted in a level-of-detail (LOD), where with each level of detail a finer representation of the point cloud attribute may be obtained. Each level of detail may be specified based on distance metric from the neighboring nodes or based on a sampling distance.

At G-PCC encoder 200, the residuals obtained as the output of the coding methods for the attributes are quantized. The residuals may be obtained by subtracting the attribute value from a prediction that is derived based on the points in the neighborhood of the current point and based on the attribute values of points encoded previously. The quantized residuals may be coded using context adaptive arithmetic coding.

In the example of FIG. 2, G-PCC encoder 200 may include a coordinate transform unit 202, a color transform unit 204, a voxelization unit 206, an attribute transfer unit 208, an octree analysis unit 210, a surface approximation analysis unit 212, an arithmetic encoding unit 214, a geometry reconstruction unit 216, an RAHT unit 218, a LOD generation unit 220, a lifting unit 222, a coefficient quantization unit 224, and an arithmetic encoding unit 226.

As shown in the example of FIG. 2, G-PCC encoder 200 may obtain a set of positions of points in the point cloud and a set of attributes. G-PCC encoder 200 may obtain the set of positions of the points in the point cloud and the set of attributes from data source 104 (FIG. 1). The positions may include coordinates of points in a point cloud. The attributes may include information about the points in the point cloud, such as colors associated with points in the point cloud. G-PCC encoder 200 may generate a geometry bitstream 203 that includes an encoded representation of the positions of the points in the point cloud. G-PCC encoder 200 may also generate an attribute bitstream 205 that includes an encoded representation of the set of attributes.

Coordinate transform unit 202 may apply a transform to the coordinates of the points to transform the coordinates from an initial domain to a transform domain. This disclosure may refer to the transformed coordinates as transform coordinates. Color transform unit 204 may apply a transform-to-transform color information of the attributes to a different domain. For example, color transform unit 204 may transform color information from an RGB color space to a YCbCr color space.

Furthermore, in the example of FIG. 2, voxelization unit 206 may voxelize the transform coordinates. Voxelization of the transform coordinates may include quantization and removing some points of the point cloud. In other words, multiple points of the point cloud may be subsumed within a single "voxel," which may thereafter be treated in some respects as one point.

Octree analysis unit 210 may generate an octree based on the voxelized transform coordinates. In accordance with the techniques of the disclosure, octree analysis unit 210 may be configured to apply global motion compensation based on global positioning system information. For example, octree analysis unit 210 may identify a first set of global motion parameters. The first set of global motion parameters may include orientation parameters (e.g., a roll, pitch, yaw, or angular velocity) and/or position parameters (e.g., a displacement or velocity along an x, y, or z dimension). In this example, octree analysis unit 210 may determine a second set of global motion parameters based on the first set of global motion parameters. For example, octree analysis unit 210 may convert the orientation parameters and/or the position parameters into a rotational matrix and a translation vector for a current frame. In this way, octree analysis unit 210 may apply global motion compensation using satellite information, which may be more accurate than estimating the rotational matrix and translation vector for the current frame based on feature points between a reference frame (e.g., a prediction frame) and the current frame.

Additionally, in the example of FIG. 2, surface approximation analysis unit 212 may analyze the points to potentially determine a surface representation of sets of the points. Arithmetic encoding unit 214 may entropy encode syntax elements representing the information of the octree and/or surfaces determined by surface approximation analysis unit 212. G-PCC encoder 200 may output these syntax elements in geometry bitstream 203. Geometry bitstream 203 may also include other syntax elements, including syntax elements that are not arithmetically encoded.

Geometry reconstruction unit 216 may reconstruct transform coordinates of points in the point cloud based on the octree, data indicating the surfaces determined by surface approximation analysis unit 212, and/or other information. The number of transform coordinates reconstructed by geometry reconstruction unit 216 may be different from the original number of points of the point cloud because of voxelization and surface approximation. This disclosure may refer to the resulting points as reconstructed points. Attribute transfer unit 208 may transfer attributes of the original points of the point cloud to reconstructed points of the point cloud.

Furthermore, RAHT unit 218 may apply RAHT coding to the attributes of the reconstructed points. In some examples, under RAHT, the attributes of a block of 2×2×2 point positions are taken and transformed along one direction to obtain four low (L) and four high (H) frequency nodes. Subsequently, the four low frequency nodes (L) are transformed in a second direction to obtain two low (LL) and two high (LH) frequency nodes. The two low frequency nodes (LL) are transformed along a third direction to obtain one low (LLL) and one high (LLH) frequency node. The low frequency node LLL corresponds to DC coefficients and the high frequency nodes H, LH, and LLH correspond to AC coefficients. The transformation in each direction may be a 1-D transform with two coefficient weights. The low frequency coefficients may be taken as coefficients of the 2×2×2 block for the next higher level of RAHT transform and the AC coefficients are encoded without changes; such transformations continue until the top root node. The tree traversal for encoding is from top to bottom used to calculate the weights to be used for the coefficients; the transform order is from bottom to top. The coefficients may then be quantized and coded.

Alternatively or additionally, LOD generation unit 220 and lifting unit 222 may apply LOD processing and lifting, respectively, to the attributes of the reconstructed points. Lifting unit 222 may be configured to perform interpolation-based hierarchical nearest-neighbour prediction with an update/lifting step (Lifting Transform). In some examples, lifting unit 222 may be configured to perform global motion compensation.

LOD generation unit 220 may be used to split the attributes into different refinement levels. Each refinement level provides a refinement to the attributes of the point cloud. The first refinement level provides a coarse approximation and contains few points; the subsequent refinement level typically contains more points, and so on. The refinement levels may be constructed using a distance-based metric or may also use one or more other classification criteria (e.g., subsampling from a particular order). Thus, all the reconstructed points may be included in a refinement level. Each level of detail is produced by taking a union of all points up to particular refinement level: e.g., LOD1 is obtained based on refinement level RL1, LOD2 is obtained based on RL1 and RL2, LODN is obtained by union of RL1, RL2, RLN. In some cases, LOD generation may be followed by a prediction scheme (e.g., predicting transform) where attributes associated with each point in the LOD are predicted from a weighted average of preceding points, and the residual is quantized, and entropy coded. The lifting scheme builds on top of the predicting transform mechanism, where an update operator is used to update the coefficients and an adaptive quantization of the coefficients is performed.

RAHT unit 218 and lifting unit 222 may generate coefficients based on the attributes. Coefficient quantization unit 224 may quantize the coefficients generated by RAHT unit 218 or lifting unit 222. Arithmetic encoding unit 226 may apply arithmetic coding to syntax elements representing the quantized coefficients. G-PCC encoder 200 may output these syntax elements in attribute bitstream 205. Attribute bitstream 205 may also include other syntax elements, including non-arithmetically encoded syntax elements.

Arithmetic encoding unit 214 may signal the first set of global motion parameters (e.g., orientation parameters and/or position parameters). In some examples, arithmetic encoding unit 214 may signal a second set of global motion parameters (e.g., a rotational matrix and a translation vector for a current frame) in geometry bitstream 203. While examples describe signaling a rotational matrix and a translation vector for a current frame to signal the second set of global motion parameters, in some examples, arithmetic encoding unit 214 may signal a portion and/or estimation of the rotational matrix and the translation vector for a current frame in geometry bitstream 203. For example, arithmetic encoding unit 214 may signal a difference of roll between the current frame and a frame of reference, a difference of pitch between the current frame and the frame of reference, a difference of yaw between the current frame and the frame of reference and a translation vector indicating an average velocity of the current frame. In some examples, arithmetic encoding unit 214 may signal the second set of global motion parameters to include a translation vector indicating only an average velocity of the current frame. In some examples, arithmetic encoding unit 214 may signal only the second set of global motion parameters to include only a magnitude of a translation vector indicating an average velocity of the current frame. In this way, arithmetic encoding unit 214 may apply global motion compensation using satellite information, which may be more accurate than estimating the rotational matrix and translation vector for the current frame based on feature points between a reference frame (e.g., a prediction frame) and the current frame.

In the example of FIG. 3, G-PCC decoder 300 may include a geometry arithmetic decoding unit 302, an attribute arithmetic decoding unit 304, an octree synthesis unit 306, an inverse quantization unit 308, a surface approximation synthesis unit 310, a geometry reconstruction unit 312, a RAHT unit 314, a LOD generation unit 316, an inverse lifting unit 318, an inverse transform coordinate unit 320, and an inverse transform color unit 322.

G-PCC decoder 300 may obtain a geometry bitstream 203 and attribute bitstream 205. Geometry arithmetic decoding unit 302 of decoder 300 may apply arithmetic decoding (e.g., Context-Adaptive Binary Arithmetic Coding (CABAC) or other type of arithmetic decoding) to syntax elements in geometry bitstream 203. Similarly, attribute arithmetic decoding unit 304 may apply arithmetic decoding to syntax elements in attribute bitstream 205.

For example, geometry arithmetic decoding unit 302 may receive global motion information (e.g., the first set of global motion parameters and/or the second set of global motion parameters) from geometry bitstream 203. For instance, geometry arithmetic decoding unit 302 may receive a second set of global motion parameters (e.g., a rotational matrix and a translation vector for a current frame). While examples describe receiving a rotational matrix and a translation vector for a current frame to signal the second set of global motion parameters, in some examples, geometry arithmetic decoding unit 302 may receive a portion and/or estimation of the rotational matrix and the translation vector for a current frame. For example, geometry arithmetic decoding unit 302 may receive a difference of roll between the current frame and a frame of reference, a difference of pitch between the current frame and the frame of reference, a difference of yaw between the current frame and the frame of reference and a translation vector indicating an average velocity of the current frame. In some examples, geometry arithmetic decoding unit 302 may receive the second set of global motion parameters that includes only a translation vector indicating an average velocity of the current frame. In some examples, geometry arithmetic decoding unit 302 may receive the second set of global motion parameters to include only a magnitude of a translation vector indicating an average velocity of the current frame.

Octree synthesis unit 306 may synthesize an octree based on syntax elements parsed from geometry bitstream 203. Starting with the root node of the octree, the occupancy of each of the eight children node at each octree level is signaled in the bitstream. When the signaling indicates that a child node at a particular octree level is occupied, the occupancy of children of this child node is signaled. The signaling of nodes at each octree level is signaled before proceeding to the subsequent octree level. At the final level of the octree, each node corresponds to a voxel position; when the leaf node is occupied, one or more points may be specified to be occupied at the voxel position. In some instances, some branches of the octree may terminate earlier than the final level due to quantization. In such cases, a leaf node is considered an occupied node that has no child nodes. In instances where surface approximation is used in geometry bitstream 203, surface approximation synthesis unit 310 may determine a surface model based on syntax elements parsed from geometry bitstream 203 and based on the octree.

Octree synthesis unit 306 may determine global motion for a current frame based on the global motion information. For example, octree synthesis unit 306 may apply global motion compensation based on a rotational matrix and a translation vector for a current frame. Again, geometry arithmetic decoding unit 302 may receive the rotational matrix and the translation vector from geometry bitstream 203. Octree synthesis unit 306 may determine or estimate the second set of global motion parameters (e.g., the rotational matrix and translation vector) based on a first set of global motion parameters and/or a portion of second global motion parameters.

For example, octree synthesis unit 306 may decode, from geometry bitstream 203, a difference of roll between the current frame and a frame of reference, a difference of pitch between the current frame and the frame of reference, a difference of yaw between the current frame and the frame of reference and a translation vector indicating an average velocity of the current frame. In this example, octree synthesis unit 306 may determine the rotation and translation vector based on the difference of roll, the difference of pitch, the difference of yaw and the translation vector.

In some examples, octree synthesis unit 306 may decode, from geometry bitstream 203, a translation vector and approximate the rotational matrix as an identity matrix. In some examples, octree synthesis unit 306 may decode, from geometry bitstream 203, a magnitude of a translation vector indicating an average velocity of the current frame and approximate the translation vector based on the received magnitude and approximate the rotational matrix as an identity matrix as a rotational matrix. In this way, octree synthesis unit 306 may apply global motion compensation using satellite information, which may be more accurate than estimating the rotational matrix and translation vector for the current frame based on feature points between a reference frame (e.g., a prediction frame) and the current frame.

Octree synthesis unit 306 may convert the orientation parameters and/or the position parameters into a rotational matrix and a translation vector for a current frame. In this way, octree synthesis unit 306 may apply global motion compensation using satellite information, which may be more accurate than estimating the rotational matrix and translation vector for the current frame based on feature points between a reference frame (e.g., a prediction frame) and the current frame.

Furthermore, geometry reconstruction unit 312 may perform a reconstruction to determine coordinates of points in a point cloud. For each position at a leaf node of the octree, geometry reconstruction unit 312 may reconstruct the node position by using a binary representation of the leaf node in the octree. At each respective leaf node, the number of points at the respective leaf node is signaled; this indicates the number of duplicate points at the same voxel position. When geometry quantization is used, the point positions are scaled for determining the reconstructed point position values.

Inverse transform coordinate unit 320 may apply an inverse transform to the reconstructed coordinates to convert the reconstructed coordinates (positions) of the points in the point cloud from a transform domain back into an initial domain. The positions of points in a point cloud may be in floating point domain but point positions in G-PCC codec are coded in the integer domain. The inverse transform may be used to convert the positions back to the original domain.

Additionally, in the example of FIG. 3, inverse quantization unit 308 may inverse quantize attribute values. The attribute values may be based on syntax elements obtained from attribute bitstream 205 (e.g., including syntax elements decoded by attribute arithmetic decoding unit 304).

Depending on how the attribute values are encoded, RAHT unit 314 may perform RAHT coding to determine, based on the inverse quantized attribute values, color values for points of the point cloud. RAHT decoding is done from the top to the bottom of the tree. At each level, the low and high frequency coefficients that are derived from the inverse quantization process are used to derive the constituent values. At the leaf node, the values derived correspond to the attribute values of the coefficients. The weight derivation process for the points is similar to the process used at G-PCC encoder 200. Alternatively, LOD generation unit 316 and inverse lifting unit 318 may determine color values for points of the point cloud using a level of detail-based technique. LOD generation unit 316 decodes each LOD giving progressively finer representations of the attribute of points. With a predicting transform, LOD generation unit 316 may derive the prediction of the point from a weighted sum of points that are in prior LODs, or previously reconstructed in the same LOD. LOD generation unit 316 may add the prediction to the residual (which is obtained after inverse quantization) to obtain the reconstructed value of the attribute. When the lifting scheme is used, LOD generation unit 316 may also include an update operator to update the coefficients used to derive the attribute values. LOD generation unit 316 may also apply an inverse adaptive quantization in this case.

Furthermore, in the example of FIG. 3, inverse transform color unit 322 may apply an inverse color transform to the color values. The inverse color transform may be an inverse of a color transform applied by color transform unit 204 of G-PCC encoder 200. For example, color transform unit 204 may transform color information from an RGB color space to a YCbCr color space. Accordingly, inverse color transform unit 322 may transform color information from the YCbCr color space to the RGB color space.

The various units of FIG. 2 and FIG. 3 are illustrated to assist with understanding the operations performed by G-PCC encoder 200 and G-PCC decoder 300. The units may be implemented as fixed-function circuits, programmable circuits, or a combination thereof. Fixed-function circuits refer to circuits that provide particular functionality, and are preset on the operations that can be performed. Programmable circuits refer to circuits that can be programmed to perform various tasks, and provide flexible functionality in the operations that can be performed. For instance, programmable circuits may execute software or firmware that cause the programmable circuits to operate in the manner defined by instructions of the software or firmware. Fixed-function circuits may execute software instructions (e.g., to receive parameters or output parameters), but the types of operations that the fixed-function circuits perform are generally immutable. In some examples, one or more of the units may be distinct circuit blocks (fixed-function or programmable), and in some examples, one or more of the units may be integrated circuits.

In accordance with the techniques of the disclosure, G-PCC encoder 200 may represent an example of a device comprising a memory to store the point cloud data and one or more processors coupled to the memory and implemented in circuitry. The one or more processors being configured to identify a first set of global motion parameters from global positioning system information, determine, based on the first set of global motion parameters, and a second set of global motion parameters to be used for global motion estimation for a current frame. The one or more processors are further configured to apply, using the second set of global motion parameters, motion compensation to a reference frame to generate a global motion compensated frame for the current frame.

G-PCC decoder 300 may represent an example of a device comprising a memory to store the point cloud data and one or more processors coupled to the memory and implemented in circuitry. The one or more processors may be configured to decode a symbols of a bitstream indicating global motion information, determine, based on the global motion information, a set of global motion parameters to be used for global motion estimation for a current frame. The one or more processors may be further configured to apply, using the set of global motion parameters, motion compensation to a reference frame to generate a global motion compensated frame for the current frame.

There are two kinds of motion involved in G-PCC techniques, global motion matrix and local node motion vector. Global motion parameters may include a rotational matrix and a translation vector. A G-PCC coder (e.g., G-PCC encoder 200 or G-PCC decoder 300) may apply global motion compensation on all the points in a reference frame (e.g., a prediction frame). Local node motion vector of a node of the octree is a motion vector that is only applied on points within the node in prediction (reference) frame. For example, the G-PCC coder may apply local node motion compensation only on a portion (e.g., a set of nodes) of the reference frame.

Figure 4:
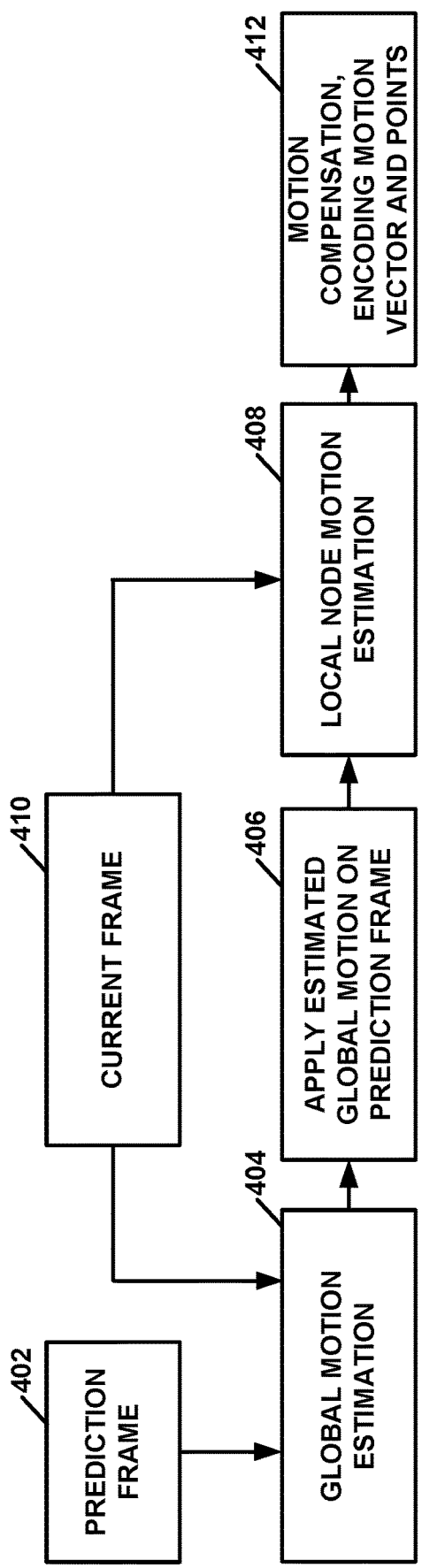
FIG. 4 is a block diagram illustrating an example motion estimation flowchart, in accordance with the techniques of the disclosure.

FIG. 4 is a block diagram illustrating an example motion estimation flowchart, in accordance with the techniques of the disclosure. Given a prediction frame 402 and current frame 410, G-PCC encoder 200 may estimate global motion first at a global scale (404). For example, G-PCC encoder 200 may generate a rotational matrix and a translation vector in accordance with techniques described herein. After applying global motion (406) on prediction frame 402, G-PCC encoder 200 may apply local node motion estimation (408) to estimate a local motion at a finer scale and a node level in an octree. G-PCC encoder 200 may apply the estimated local node motion in motion compensation. For example, G-PCC encoder 200 may apply motion estimation and encode motion vector information and point information (412).

Figure 5:
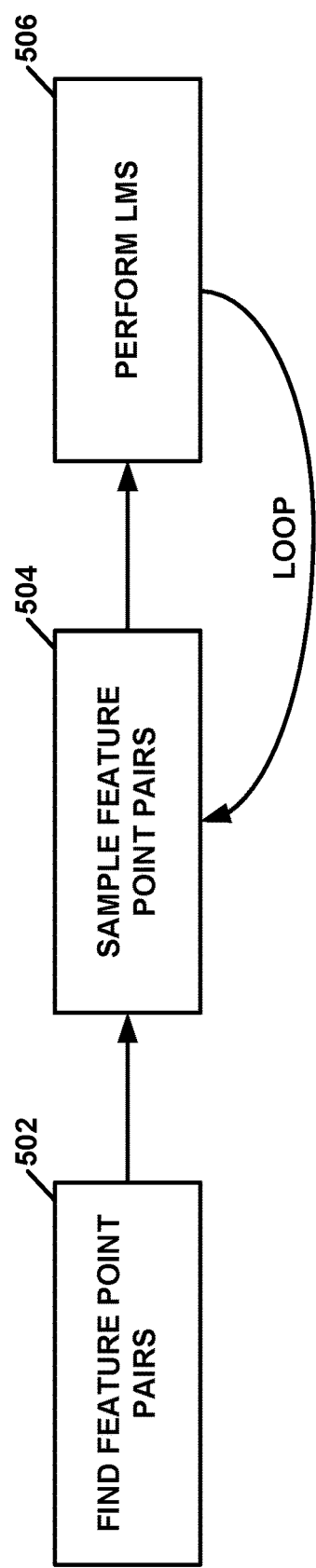
FIG. 5 is a block diagram illustrating an example algorithm for estimation of global motion, in accordance with the techniques of the disclosure.

FIG. 5 is a block diagram illustrating an example algorithm for estimation of global motion. The process illustrated in FIG. 5 may be an example of step 404 of FIG. 4. G-PCC encoder 200 may be configured to define a global motion matrix to match feature points between a prediction frame (reference) and the current frame. The whole global motion estimation algorithm could be divided into three steps: finding feature points (502), sampling feature point pairs (504), and motion estimation using a Least Mean Square (LMS) algorithm (506).

G-PCC encoder 200 may perform the LMS algorithm (506) to define that points that have large position change between a prediction frame and a current frame as feature points. For each point in the current frame, G-PCC encoder 200 may find the closest point in a prediction frame and may build point pairs between the current frame and the prediction frame (502). If the distance between the paired points is greater than a threshold, G-PCC encoder 200 may regard the paired points as feature points.

After finding the feature points, the G-PCC coder may perform a sampling on the feature points to reduce the scale of the problem (e.g., by choosing a subset of feature points to reduce the complexity of motion estimation) (504). Then, G-PCC encoder 200 may apply the least means squared (LMS) algorithm to derive motion parameters by trying to reduce the error between respective features points in the prediction frame and the current frame (506). The process may loop for each of the feature point pairs of step 502.

Figure 6:
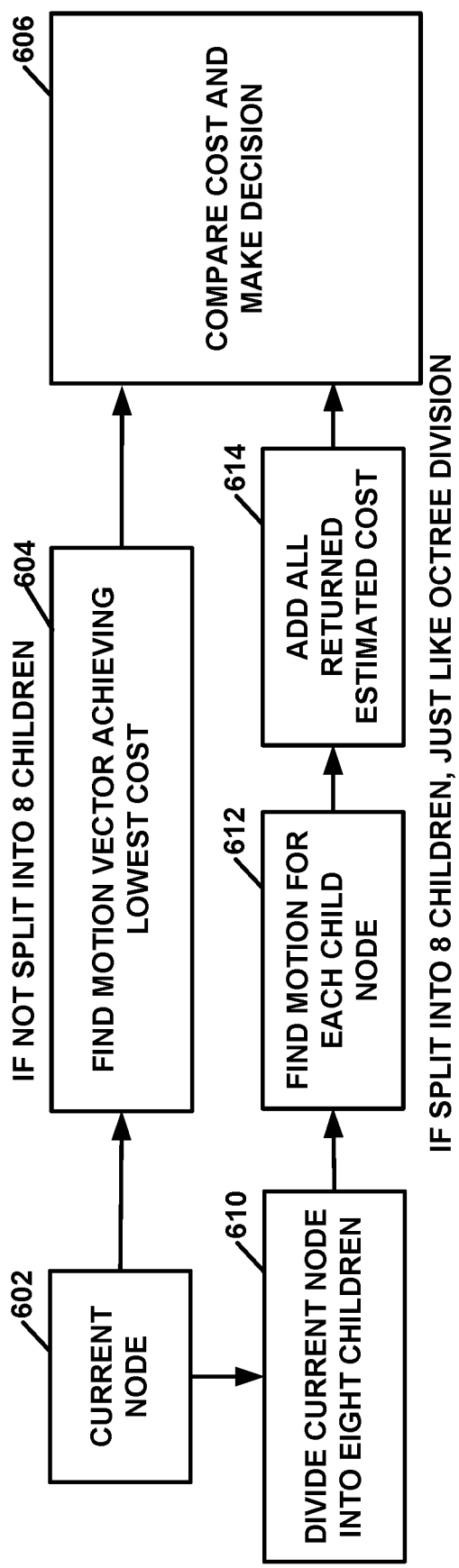
FIG. 6 is a block diagram illustrating an example algorithm for estimation of a local node motion vector, in accordance with the techniques of the disclosure.

FIG. 6 is a block diagram illustrating an example algorithm for estimation of a local node motion vector. The process illustrated in FIG. 6 may be an example of step 408 of FIG. 4. In the example of FIG. 6, G-PCC encoder 200 may estimate the motion vector in a recursive manner. G-PCC encoder 200 may use a cost function for choosing the best suitable motion vector that is based on the rate-distortion cost.

If a current node is not split into 8 children, G-PCC encoder 200 may determine the motion vector that could result in the lowest cost between current node 602 and a prediction node. If the current node is divided into 8 children (610), G-PCC encoder 200 may apply the motion estimation algorithm to find motion for each child node (612) and may obtain the total cost under split condition by adding the estimated cost value of each child node (614). G-PCC encoder 200 may arrive at the decision whether to split or not to split by comparing the cost between splitting and not splitting (606). If the current node is split, G-PCC encoder 200 may assign each sub-node a respective motion vector (or may be further split to its children). If the current node is not split, G-PCC encoder 200 may find a motion vector achieving a lowest cost (604) and may assign the current node the motion vector.

Two parameters that affect the performance of motion vector estimation are block size (BlockSize) and minimum prediction unit size (MinPUSize). BlockSize defines the upper bound of node size to apply motion vector estimation and MinPUSize defines the lower bound.

G-PCC encoder 200 may generate a motion matrix and translation vector that forces G-PCC encoder 200 to "match" respectively feature points between the prediction (reference) frame and current frame. The detected feature points may not be reliable, which may lead to incorrect global motion parameter estimation, thus introducing additional distortion instead of compensating global motion. This additional distortion in turn may lead to lower coding efficiency than when the global motion is compensated properly.

In some systems, detected feature points in consecutive frames may not match. For example, the relative rotation and/or translation between respective features points in consecutive frames may be different. If a G-PCC coder (e.g., G-PCC encoder 200 or G-PCC decoder 300) forces the respective feature points in consecutive frames to match with each other, distortion may occur.

An issue with current motion estimation structures is the running efficiency. The total running time may be 25 times more than an anchor version used as reference. In the extra total running time, nearly half of the time is typically spent on global motion estimation and nearly half typically spent on local node motion estimation. Such high run times may not be practical for certain applications (e.g., real-time coding of point cloud compression), and thus prevent the motion estimation in such applications.

In accordance with the techniques of the disclosure, a G-PCC coder (e.g., G-PCC encoder 200 or G-PCC decoder 300) may be configured to apply global motion compensation based on global positioning system information. In accordance with the techniques of the disclosure, the G-PCC coder may be configured to apply motion compensation using one or more of the following techniques.

1) G-PCC encoder 200 may identify a first set of global motion parameters from GPS (global positioning system) information. As used herein, global positioning system, also referred to herein as simply "GPS" may refer to any satellite system, such as, for example, the global positioning system (GPS) implemented in the Unites States, the global navigation satellite system (GLONASS), the BeiDou navigation satellite system (BDS), the Galileo, quasi-zenith satellite system (QZSS), the regional navigation satellite system (IRNSS), or another satellite system.

a. The first set of global motion parameters may include a set of orientation parameters, e.g., roll, pitch, yaw, angular velocity, etc. That is, G-PCC encoder 200 may identify the first set of global motion parameters to include a set of orientation parameters. In some examples, the set of orientation parameters may comprise one or more of a roll, a pitch, a yaw, or an angular velocity for the current frame.

b. In some examples, three parameters of orientations may be specified based on a frame of reference. Any such, three parameters may be included in the first set of global motion parameters. For example, given roll, pitch and yaw for a last frame, the orientation parameters may include the difference of roll, pitch and yaw between current frame and last frame. That is, G-PCC encoder 200 may identify the set of orientation parameters to comprise one or more of a difference of roll between the current frame and a frame of reference, a difference of pitch between the current frame and the frame of reference, a difference of yaw between the current frame and the frame, or a difference of angular velocity between the current frame and the frame of reference.

c. The first set of global motion parameters may include a set of position parameters, e.g., displacement in x, y, z dimensions, or velocity (for example, velocity-x, velocity-y, velocity-z). That is, G-PCC encoder 200 may identify the set of orientation parameters to comprise a set of position parameters. In some examples, the set of position parameters may comprise one or more of a displacement for the current frame or an average velocity for the current frame.

d. In some examples, three parameters of position may be specified based on a frame of reference. That is, G-PCC encoder 200 may identify the set of orientation parameters to comprise three parameters of position based on a frame of reference. Any such, three parameters may be included in the first set of global motion parameters. For example, East-North-Up coordinate systems could be used to computed position parameters. That is, the set of position parameters may comprise one or more of a velocity of east, a velocity of north, or a velocity of up of an East-North-Up coordinate system.

2) A G-PCC coder (e.g., G-PCC encoder 200 or G-PCC decoder 300) may derive a second set of global motion parameters from the first set of global motion parameters to be used for global motion estimation. That is, the G-PCC coder may determine, based on the first set of global motion parameters, a second set of global motion parameters to be used for global motion estimation for a current frame.

a. The second set of global motion parameters may include elements of a global motion matrix, which may represent (e.g., describe) a rotational matrix and a translation vector. That is, a G-PCC coder (e.g., G-PCC encoder 200 or G-PCC decoder 300) may derive the second set of global motion parameters from the first set of global motion parameters to comprise a rotational matrix indicating a yaw, a pitch, and a roll for the current frame and a translation vector indicating an average velocity for the current frame.

b. The second set of global motion parameters can be accurately computed from the first set of global motion parameters or approximated.

3) A G-PCC coder (e.g., G-PCC encoder 200 or G-PCC decoder 300) may use the second set of global motion parameters to apply motion compensation to a reference frame, resulting in a compensated frame. That is, the G-PCC coder may apply, using the second set of global motion parameters, motion compensation to a reference frame to generate a global motion compensated frame for the current frame.

a. The G-PCC coder may use the compensated frame as a reference for motion estimation for the current frame.

b. In some examples, a G-PCC coder (e.g., G-PCC encoder 200 or G-PCC decoder 300) may apply the compensation by first applying a rotation followed by translation.

c. In some examples, the G-PCC coder may apply the compensation by first applying a translation followed by rotation.

4) G-PCC encoder 200 may signal the second set of global motion parameters in the bitstream. G-PCC encoder 200 may use the second set of global motion parameters to enable G-PCC decoder 300 to estimate global motion and apply prediction or motion compensation. That is, G-PCC encoder 200 may signal the second set of global motion parameters in the bitstream. For example, G-PCC encoder 200 may signal a rotational matrix indicating a yaw, a pitch, and a roll for the current frame and a translation vector indicating an average velocity for the current frame. Similarly, G-PCC decoder 300 may decode, from a bitstream, a rotational matrix indicating a yaw, a pitch, and a roll for the current frame and a translation vector indicating an average velocity for the current frame.

a. In some examples, G-PCC encoder 200 may signal the first set of global motion parameters in a bitstream. In this example, G-PCC decoder 300 may derive the second set of global motion parameters. That is, G-PCC encoder 200 may signal the first set of global motion parameters in a bitstream. For example, G-PCC encoder 200 may signal one or more of set of orientation parameters or a set of translational parameters identified from global positioning system information. Similarly, G-PCC decoder 300 may decode, from a bitstream, one or more of set of orientation parameters or a set of translational parameters identified from global positioning system information. As described below, G-PCC encoder 200 may encode a portion and/or an estimation of the first set of global motion parameters and/or the second set of global motion parameters.

5) A G-PCC coder (e.g., G-PCC encoder 200 or G-PCC decoder 300) may find a suitable combination of global motion parameters for local node motion vector estimation trying to find a balanced trade-off between running time and performance. That is, the G-PCC coder may restrict a block size for local motion to be equal to a minimum prediction unit size.

a. A G-PCC coder (e.g., G-PCC encoder 200 or G-PCC decoder 300) may restrict the blockSize for local motion to be equal to the minPuSize. This may help to ensure that the runtime for local motion vector estimation is minimized with limited impact on the coding efficiency.

6) A G-PCC coder (e.g., G-PCC encoder 200 or G-PCC decoder 300) may improve the global motion estimation algorithm by one or more of the following steps:

a. First, a G-PCC coder (e.g., G-PCC encoder 200 or G-PCC decoder 300) may estimate an initial translation vector by minimizing Mean Squared Error between current frame and reference frame. That is, a G-PCC coder (e.g., G-PCC encoder 200 or G-PCC decoder 300) may estimate an initial translation vector by minimizing Mean Squared Error between current frame and reference frame. When estimating the initial translation vector, the G-PCC coder may take into consideration labels for whether a point is ground or not. That is, a G-PCC coder (e.g., G-PCC encoder 200 or G-PCC decoder 300) may determine whether a point is ground or not. In this example, the G-PCC coder may estimate a rotational matrix for a second current frame based whether the point is ground or not.

b. A G-PCC coder (e.g., G-PCC encoder 200 or G-PCC decoder 300) may combine the initial translation vector with an identity matrix and may feed the combined initial translation vector and identity matrix into an iterative closest point scheme or similar scheme to estimate rotational matrix and translation vector.

c. In some examples, a G-PCC coder (e.g., G-PCC encoder 200 or G-PCC decoder 300) may estimate the rotational matrix first based on labels for whether a point is ground or not. That is, a G-PCC coder (e.g., G-PCC encoder 200 or G-PCC decoder 300) may determine whether a point is ground or not. In this example, the G-PCC coder may estimate a rotational matrix for a second current frame based on whether the point is ground or not. For example, G-PCC encoder 200 may derive the label and signal the label to G-PCC decoder 300. That is, G-PCC encoder 200 may signal a set of labels indicating whether the point is ground or not. In some examples, G-PCC encoder 200 and G-PCC decoder 300 may each derive the label. The G-PCC coder may derive the label based on a ground estimation algorithm; such algorithms could be based on height of a point, density of the point cloud in the neighborhood of the point, relative distance of the point from the LIDAR origin/fixed points, etc.

d. A G-PCC coder (e.g., G-PCC encoder 200 or G-PCC decoder 300) may feed the initial rotational matrix with zero translation vector into an iterative closest point scheme or similar scheme to estimate the rotational matrix and translation vector.

In this example, a G-PCC coder (e.g., G-PCC encoder 200 or G-PCC decoder 300) may derive global motion parameters from GPS information. The GPS information could include values/parameters that may be used in the derivation of roll-pitch-yaw information and velocity under East-North-Up coordinates system for each time stamp (or acquired point, or estimates for each acquired point). For example, the G-PCC coder may directly compute a global motion matrix and translation vector from those provided items of information.

A rotational matrix may define a change of axis from a reference frame to current frame. Given roll, pitch and yaw for reference frame (roll$_{ref}$, pitch$_{ref}$, yaw$_{ref}$) and current frame (roll$_{cur}$, pitch$_{cur}$, yaw$_{cur}$), a G-PCC coder (e.g., G-PCC encoder 200 or G-PCC decoder 300) may use a difference of roll, pitch and yaw for the derivation. The G-PCC coder may calculate the difference as $\Delta_{roll}$=roll$_{cur}$−roll$_{ref}$, $\Delta_{pitch}$=pitch$_{cur}$−pitch$_{ref}$, $\Delta_{yaw}$=yaw$_{cur}$−yaw$_{ref}$.

Rotational matrix for roll is $$R_{roll} = \begin{bmatrix} \cos(\Delta_{roll}) & 0 & \sin(\Delta_{roll}) \\ 0 & 1 & 0 \\ -\sin(\Delta_{roll}) & 0 & \cos(\Delta_{roll}) \end{bmatrix}$$

Rotational matrix for pitch is $$R_{pitch} = \begin{bmatrix} 1 & 0 & 0 \\ 0 & \cos(\Delta_{pitch}) & -\sin(\Delta_{pitch}) \\ 0 & \sin(\Delta_{pitch}) & \cos(\Delta_{pitch}) \end{bmatrix}$$

Rotational matrix for yaw is $$R_{yaw} = \begin{bmatrix} \cos(\Delta_{yaw}) & -\sin(\Delta_{yaw}) & 0 \\ \sin(\Delta_{yaw}) & \cos(\Delta_{yaw}) & 0 \\ 0 & 0 & 1 \end{bmatrix}$$

The final rotational matrix is $R = R_{yaw} R_{pitch} R_{roll}$

In some examples, a G-PCC coder (e.g., G-PCC encoder 200 or G-PCC decoder 300) may be configured to determine whether a positive direction of one or more of roll, pitch, and yaw has occurred. The G-PCC coder may change the sign of angles accordingly because the positive direction could be defined differently.

For translation vector, a G-PCC coder (e.g., G-PCC encoder 200 or G-PCC decoder 300) may use velocity of East-North-Up (ENU) because the ENU coordinate system aligns well with coordinate system for point cloud frame. The G-PCC coder may compute the average velocity of reference frame and current frame as V=(v$_{East}$, v$_{North}$, v$_{Up}$). The G-PCC coder may decompose the velocity vector into the coordinates under a coordinate system of a reference frame.

A G-PCC coder (e.g., G-PCC encoder 200 or G-PCC decoder 300) may compute a new rotational matrix for velocity as:

Rotational matrix of velocity for roll is $$R_{roll}^v = \begin{bmatrix} \cos(\text{roll}_{ref}) & 0 & \sin(\text{roll}_{ref}) \\ 0 & 1 & 0 \\ -\sin(\text{roll}_{ref}) & 0 & \cos(\text{roll}_{ref}) \end{bmatrix}$$

Rotational matrix of velocity for pitch is $$R_{pitch}^v = \begin{bmatrix} 1 & 0 & 0 \\ 0 & \cos(\text{pitch}_{ref}) & -\sin(\text{pitch}_{ref}) \\ 0 & \sin(\text{pitch}_{ref}) & \cos(\text{pitch}_{ref}) \end{bmatrix}$$

Rotational matrix of velocity for yaw is $$R_{yaw}^v = \begin{bmatrix} \cos(\text{yaw}_{ref}) & -\sin(\text{yaw}_{ref}) & 0 \\ \sin(\text{yaw}_{ref}) & \cos(\text{yaw}_{ref}) & 0 \\ 0 & 0 & 1 \end{bmatrix}$$

The final rotational matrix for velocity is $R^v = R_{yaw}^v R_{pitch}^v R_{roll}^v$ The G-PCCC may compute the translation vector as:

$T = tR^v V$

Here t is time for one frame. Also, the positive direction should be taken into consideration to derive a correct translation vector.

In this example, a G-PCC coder (e.g., G-PCC encoder 200 or G-PCC decoder 300) may only signal roll-pitch-yaw and translation vector instead of all 12 elements for global motion. This will reduce the number global motion parameters from 12 to 6. That is, G-PCC encoder 200 may signal a rotational matrix indicating a yaw, a pitch, and a roll, which includes 9 elements, for the current frame and a translation vector, which includes 3 elements, indicating an average velocity for the current frame (e.g., a total of 12 elements). In some examples, G-PCC encoder 200 may signal a roll for the current frame, a pitch for the current frame, a yaw for the current frame, and a translation vector indicating an average velocity for the current frame (e.g., a total of 6 elements) without signaling the complete global rotational matrix.

A G-PCC coder (e.g., G-PCC encoder 200 or G-PCC decoder 300) may determine a rotational matrix and a translation vector. The G-PCC coder may use the main parameters of a differences in roll, pitch, yaw ($\Delta_{roll}$, $\Delta_{pitch}$, $\Delta_{yaw}$) and a translation vector. Instead of compressing/signalling the whole rotational matrix, G-PCC encoder 200 may only signal the delta and translation vector, and that will reduce the number of parameter signaled from 12 (9 for rotational matrix and 3 for translation vector) to 6 (3 for delta values and 3 for translation vector). That is, G-PCC encoder 200 may signal a difference of roll between the current frame and a frame of reference, a difference of pitch between the current frame and the frame of reference, a difference of yaw between the current frame and the frame of reference and a translation vector indicating an average velocity of the current frame (e.g., 6 elements). Similarly, G-PCC decoder 300 may decode a difference of roll between the current frame and a frame of reference, a difference of pitch between the current frame and the frame of reference, a difference of yaw between the current frame and the frame of reference and a translation vector indicating an average velocity of the current frame (e.g., 6 elements).

Furthermore, a G-PCC coder (e.g., G-PCC encoder 200 or G-PCC decoder 300) may reduce the number global motion parameters by approximation. The elements in rotational matrix is close to 1 and 0, so that the G-PCC coder may approximate a rotational matrix to be an identity matrix. With that, 6 parameters could be further reduced to only 3 for translation vector. That is, G-PCC encoder 200 may signal a translation vector indicating an average velocity of the current frame (e.g., 3 elements) and refrain from signaling a rotational matrix indicating a yaw, a pitch, and a roll for the current frame. Similarly, G-PCC decoder 300 may decode a translation vector indicating an average velocity of the current frame (e.g., 3 elements) and refrain from decoding a rotational matrix indicating a yaw, a pitch, and a roll for the current frame.

Assuming that a vehicle (e.g., equipped with a LIDAR) will be moving forward most of the time, a G-PCC coder (e.g., G-PCC encoder 200 or G-PCC decoder 300) may approximate the translation vector to be $T_{appr}=[0, abs(T), 0]$ where abs( ) is the absolute function to compute the magnitude of translation vector T. Then, the total number global motion parameters could be reduced to be only 1. In this example, the system is defined such that the vehicle is moving in the positive y direction, but similar derivations could apply to other systems too. That is, G-PCC encoder 200 may signal a magnitude of a translation vector indicating an average velocity of the current frame. Similarly, G-PCC decoder 300 may decode a translation vector indicating a magnitude of a translation vector indicating an average velocity of the current frame.

Different combinations of input parameters, BlockSize and MinPUSize, are tried to find a balanced tradeoff point between running time and performance.

A G-PCC coder (e.g., G-PCC encoder 200 or G-PCC decoder 300) may determine two times BlockSize and two times MinPUSize to achieve a balanced trade-off between performance gain and running time.

In some examples, a G-PCC coder (e.g., G-PCC encoder 200 or G-PCC decoder 300) may set BlockSize equal to MinPUSize to achieve a balanced trade-off between performance gain and running time. That is, the G-PCC coder may perform motion vector estimation for current frame based on the global motion compensated frame, wherein, to perform motion vector estimation, the G-PCC coder is configured to restrict a block size for local motion to be equal to a minimum prediction unit size.

The global motion estimation algorithm may be improved by configuring a G-PCC coder (e.g., G-PCC encoder 200 or G-PCC decoder 300) to estimate a translation vector first by minimizing mean-squared error (MSE) between a current frame and a prediction (reference) frame. That is, the G-PCC coder may estimate an initial translation vector by minimizing mean squared error between a second current frame and a second reference frame. Then, after applying estimated translation vector, a G-PCC coder (e.g., G-PCC encoder 200 or G-PCC decoder 300) may determine the rotational matrix.

There may be two steps for new global motion estimation algorithm. The first step is to configure a G-PCC coder (e.g., G-PCC encoder 200 or G-PCC decoder 300) to compute an initial translation vector T'. The second step is to cause the G-PCC coder to feed T' and identity matrix into an iterative closest point algorithm (e.g., provided by open3d library) or similar alternative.

A step is to configure the G-PCC coder to estimate T'. Suppose T'=[a, b, c]. The translation vector is supposed to minimize the MSE between current frame and prediction frame. Here, the G-PCC may represent the MSE from the following loss function:

$$L = \frac{\sqrt{\sum_i w_i\left((x_i^A + a - x_i^B)^2 + (y_i^A + b - y_i^B)^2 + (z_i^A + c - z_i^B)^2\right)}}{N}$$

Here, point ($x_i^A$, $y_i^A$, $z_i^A$) is a point from a reference frame and point ($x_i^B$, $y_i^B$, $z_i^B$) is from the current frame. $w_i$ is weight function which is defined as distance to center: $w_i = \sqrt{(x_i^A)^2+(y_i^A)^2+(z_i^A)^2}$. The variable N denotes the total number of points.

To minimize the L, we have $$\frac{\partial L}{\partial a} = \frac{1}{2L}\sum_i 2w_i(x_i^A - x_i^B + a) = 0$$

The computed a will be:

$$a = \frac{\sum_i w_i(x_i^A - x_i^B)}{\sum_i w_i}$$

b and c could also be derived:

$$b = \frac{\sum_i w_i(y_i^A - y_i^B)}{\sum_i w_i}$$

-continued $$c = \frac{\sum_i w_i(c_i^A - c_i^B)}{\sum_i w_i}$$

However, only computing a, b and c once may not be accurate enough because the motion between frames is always large. A G-PCC coder (e.g., G-PCC encoder 200 or G-PCC decoder 300) may define a loop number 1. For the first iteration, given reference frame f0 and current frame, the G-PCC coder may compute $T_o'$. Then, the G-PCC coder may apply $T_o'$ on f0 to get a new reference frame f1. The G-PCC coder may compute $T_1'$ between f1 and the current frame. The G-PCC may carry this loop out/times to get our final translation vector $T' = \Sigma_0^l T_i'$.

Another modification is for weight function. The ground point could 'confuse' the algorithm performed by a G-PCC coder (e.g., G-PCC encoder 200 or G-PCC decoder 300) for estimating global motion, so the G-PCC coder may 'turn off' ground point. The weight function could be modified by:

$$w_i = \begin{cases} 0 & \text{if this point is ground point} \\ w_i & \text{Otherwise} \end{cases}$$

A G-PCC coder (e.g., G-PCC encoder 200 or G-PCC decoder 300) may determine that a point is ground point or otherwise based on one or more characteristics of the point such as height, distance from the center of the point cloud frame, distance from a point in the frame along a certain plane (e.g., x-y plane), etc.

In addition to the location of points of an object/scene/point cloud with respect to a local reference, several applications also use the location with respect to a fixed position on the earth. There are several coordinate systems that are used to describe geographic positions of points. The following briefly describes some coordinate systems that are used in several applications.

One such system is the geodetic system. Additional discussion may be found at https://en.wikipedia.org/wiki/Geodetic_datum. The geodetic system uses a set of three values—latitude, longitude, and altitude.

Figure 7:
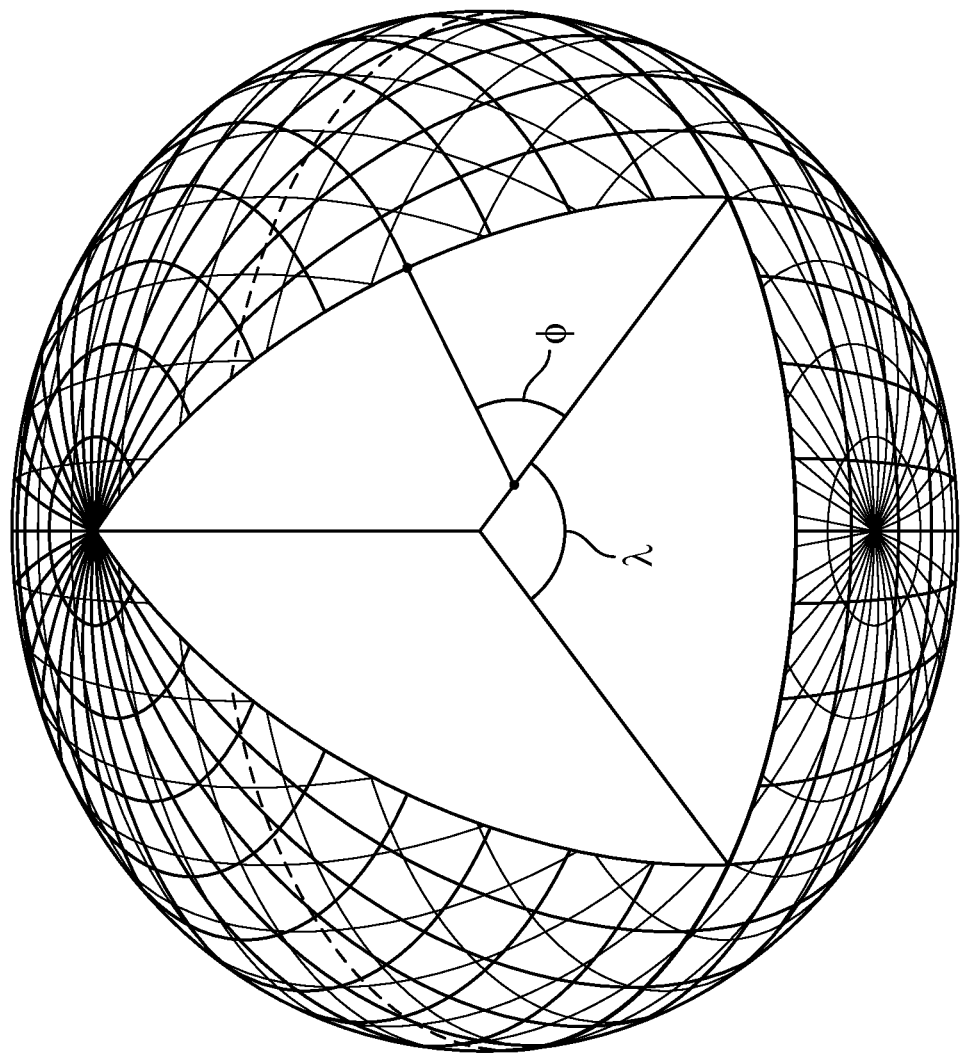
FIG. 7 is a conceptual diagram illustrating the geodetic latitude and longitude of a point as measured on the ellipsoid approximation of earth.

FIG. 7 is a conceptual diagram illustrating the geodetic latitude and longitude of a point as measured on the ellipsoid approximation of earth. FIG. 7 shows how the geodetic latitude of a point is obtained, as the angle formed by the normal of the point on the earth's surface (an ellipsoidal approximation) and the equatorial plane. The angle $\phi$ denotes the north-south position of the point with respect to the earth. The longitude is measured as the angle $\lambda$ (in degrees) between the Prime meridian (chosen as a point in Greenwich, England) with positive angles measured to the east of the Prime meridian and negative angles to the west. The altitude is defined as the distance measured in units above the ellipsoidal surface in the direction that is normal to the ellipsoid. Additional discussion may be found at https://en.wikipedia.org/wiki/Geodetic_datum.

Another coordinate system is an Earth-Center Earth-Fixed (ECEF) coordinate system which is now discussed. Under this system, the center of the earth is chosen as the point of reference, and the position of the point on the earth (or anywhere in space, typically near the earth's surface) is described with respect to this origin in terms of displacements in x, y and z dimensions. The positive z-axis is chosen as the line from the origin to the north pole. The positive x axis is chosen as the line joining the center towards the point on the earth's surface that has 0 degrees latitude and 0 degrees longitude.

Figure 8:
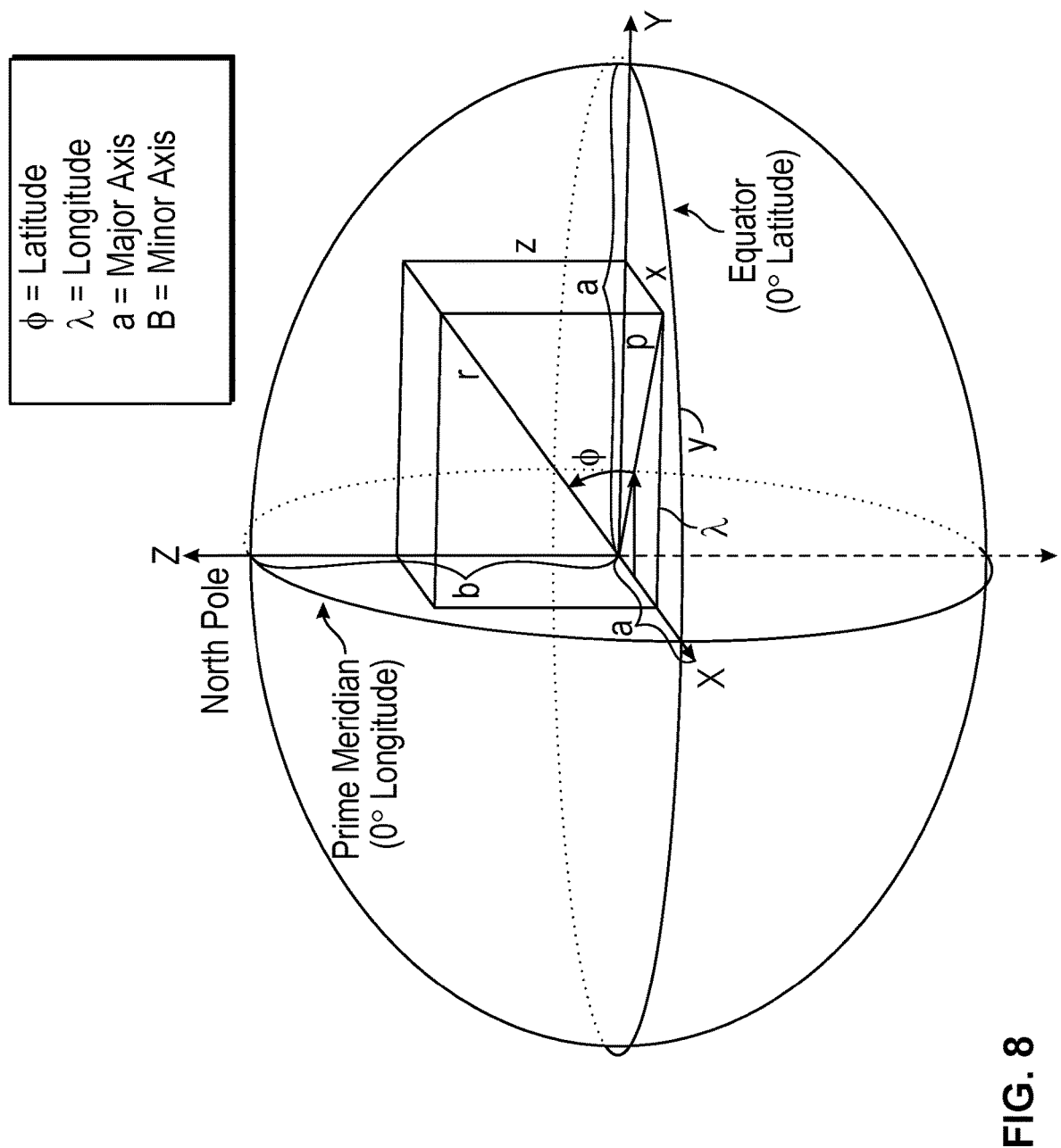
FIG. 8 is a conceptual diagram illustrating the ECEF (earth-centered, earth-fixed) coordinate system (X, Y, Z axes) with respect to the equator and Prime meridian (0 degree latitude and longitude).

FIG. 8 is a conceptual diagram illustrating the ECEF (earth-centered, earth-fixed) coordinate system (X,Y,Z axes) with respect to the equator and Prime meridian (0 degree latitude and longitude). An illustration of the ECEF system with respect to the latitude and longitude is shown in FIG. 8. Additional discussion may be found at https://en.wikipedia.org/wiki/ECEF.

A local tangent system (ENU, NED) is now discussed. The local tangent system specifies a local tangent plane on the surface of the earth and describes the point positions in that plane with east, north and up (ENU) displacements. An equivalent system may be described using a north, east and down (NED) displacements. Different systems may be used in different applications. In some examples, the displacement may be described in units of meters.

In addition to the ENU/NED displacements, this system also uses a reference from which the displacements are measured. The ENU/NED reference may be described by the ECEF or geodetic system, or another coordinate system. One advantage of the ENU/NED system may be that the relative displacement values are typically smaller compared to absolute positions in terms of ECEF coordinates.

The orientation of point clouds is now discussed. Orientation of objects in a scene may also be important for applications that may want to visualize the point cloud(s) with information from the surrounding scene. To do this, the orientation of the one or more of x, y and z axes of the point cloud frame must be known with respect to a fixed reference. This may be described as a rotation of the fixed reference xyz-axes to the axis used by the point cloud frame. The rotation may either be described as a matrix, or as a triplet of roll-pitch-yaw angles.

In some examples of G-PCC, G-PCC encoder 200 and G-PCC decoder 300 may code the x, y, z positions of the points in the point cloud with respect to a slice origin, and the slice origin may be in turn coded with respect to an origin that is specified in the sequence parameter set (SPS) which may be signaled by G-PCC encoder 200; this (referred to as SPS origin) is the actual origin of the point cloud frame. The current signaling also includes a scale flag that indicates whether the coordinate values obtained after applying the non-normative scaling operation at the decoder-side have units of meters.

However, the absolute position of the SPS origin is not specified in current examples of G-PCC. In some applications (e.g., geospatial data visualization), it may be useful to convey the actual position of the frame origin to indicate where the point cloud was acquired or the point cloud's relationship with geo-spatial objects. For example, an application may want to render the point cloud information in addition to other attributes acquired at a particular location simultaneously. Without the position of the SPS origin, the G-PCC decoder 300 or the application may have to perform expensive registration and classification algorithms to identify the location of the SPS origin.

In some systems, in addition to the position of the point cloud origin, the orientation information may also be important. In order for G-PCC decoder 300 to properly render the point cloud, G-PCC encoder 200 informs G-PCC decoder 300 of the orientation of the x, y, z axis. This informing of the orientation of the x, y, z axis is not currently supported in G-PCC. In a more specific example, a LIDAR system on a car captures the point cloud with respect to the car's direction of motion (e.g., the vehicle may assume that the direction of motion of the vehicle is the positive y direction), which may change at every frame. The orientation information (also the SPS origin) could be frame-specific.

One or more of the following techniques may be applied independently or in combination.

Geolocation/GIS projection is now discussed. In some examples, G-PCC encoder 200 may signal the position of the SPS origin with respect to a fixed reference. G-PCC decoder 300 may parse the signaled position. More generally, the position of the origin associated with a point cloud frame may be signaled.

In some examples, G-PCC encoder 200 may specify the position of the SPS origin with respect to a fixed origin and coordinate axes using offsets in the respective dimensions. G-PCC decoder 300 may parse the specified position. In one example, the ECEF system may be used to describe the SPS origin. In one example, the ENU system may be used to describe the SPS origin. In one example, the geodetic system may be used to describe the SPS origin. More generally, any positioning system may be used.

In some examples, G-PCC encoder 200 may signal a syntax element that is used to indicate the coordinate system that is used to describe the position of the SPS origin. G-PCC decoder 300 may parse the syntax element to determine the coordinate system.

In some examples, G-PCC encoder 200 may signal one or more syntax elements that indicate the number of bits used to code the positions of the SPS origin in the indicated coordinate system. G-PCC decoder 300 may parse the syntax element to determine the number of bits.

Orientation is now discussed. In some examples, G-PCC encoder 200 may use parameters that describe the orientation of the x, y, z axis. For example, the parameters may describe a rotation from a fixed axes system (e.g., ECEF XYZ axes). In some examples, the parameters may describe a rotational matrix. In some examples, the parameters may describe a roll, pitch and yaw.

In some examples, G-PCC encoder 200 may signal a syntax element that is used to indicate the coordinate system that is used to describe the orientation of the point cloud frame axes. G-PCC decoder 300 may parse the syntax element to determine the coordinate system.

In some examples, G-PCC encoder 200 may signal one or more syntax elements that indicate the number of bits used to code the parameters to describe the orientation of the point cloud frame. G-PCC decoder 300 may parse the syntax element to determine the number of bits.

Restrictions on position and orientation are now discussed. G-PCC encoder 200 may apply certain restrictions based on certain constraints applicable due to the nature of the application systems used. For example, G-PCC encoder 200 may, for LIDAR data captured by a car, limit the position information by only providing the latitude and the longitude and not specifying the elevation. In other examples, for LIDAR captured data, G-PCC encoder 200 may only provide a velocity of the car in the ENU direction to enable G-PCC decoder 300 to derive the position, and similarly provide an angular velocity to specify the orientation across multiple frames.

In some examples, other parameters associated with the point cloud may also be signaled, such as angular velocity, angular acceleration, linear velocity, linear acceleration, a time associated with the capture of the point cloud frame, etc.

Frame-based vs sequence-based signaling is now discussed. In some examples, the position and/or orientation of the point cloud origin and the axes orientation are fixed for the entire sequence or bitstream. In such cases, for example, G-PCC encoder 200 may signal the position of the point cloud origin and axes orientation only once per sequence (e.g., in a parameter set such as an SPS). G-PCC decoder 300 may parse syntax elements in the parameter set to determine the position and orientation.

In some examples, the position and/or orientation of the point cloud origin may vary from frame to frame, and G-PCC encoder 200 may signal the values for one or more frames. G-PCC decoder 300 may parse signaled values to determine the position and orientation.

The following example shows how the position and the coordinate of the point cloud origin may be described on a per-frame basis.

|  | Descriptor |
|---|---|
| point_cloud_origin_orientation_inventory( ) { |  |
|   pcoo_update_flag | u(1) |
|   pcoo_origin_info_present_flag | u(1) |
|   if( pcoo_origin_info_present_flag ) |  |
|     pcoo_origin_coordinate_system_id | u(8) |
|     pcoo_origin_coordinate_num_params | ue(v) |
|     pcoo_origin_coordinate_num_bits |  |
|     for( i = 0; i < pcoo_origin_coordinate_ |  |
|     num_params; i ++) { |  |
|       pcoo_origin_coordinate_val[ i ] | s(v) |
|     } |  |
|   pcoo_orientation_info_present_flag | u(1) |
|   if( pcoo_orientation_info_present_flag ) |  |
|     pcoo_origin_orientation_system_id | u(8) |
|     pcoo_origin_orientation_num_params | ue(v) |
|     pcoo_origin_coordinate_num_bits | ue(v) |
|     for( i = 0; i < pcoo_origin_coordinate_ |  |
|     num_params; i++) { |  |
|       pcoo_origin_coordinate_val[ i ] | s(v) |
|     } |  |
| } |  | pcoo_update_flag equal to 0 specifies that the syntax structure contains at least one of the position of the SPS origin and the orientation of the axes for the current frame with respect to some fixed systems as indicated by pcoo_origin_coordinate_system_id and pcoo_origin_orientation_system_id, respectively. pcoo_update_flag equal to 1 specifies that the syntax structure contains positions of the SPS origin and the orientation of the axes for the current frame with respect to some fixed systems as indicated by pcoo_origin_coordinate_system_id and pcoo_origin_orientation_system_id, respectively, where the pcoo_origin_coordinate_val[ ] and pcoo_origin_orientation_val[ ] indicate delta coded values from previous frame that had pcoo_update_flag equal to 0.

In some examples, restrictions may be added such that the pcoo_update_flag may be 0 only for pictures that are not likely to be removed from the bitstream (e.g., frames associated with lowest frame rate, or first frame of sequence).

In one example, an ID is specified for each syntax structure and when pcoo_update_flag is equal to 1, a reference ID to the reference position and orientation is signaled.

In some examples, the reference position and orientation is chosen as the previous point cloud frame that has the same or lower temporal ID than the current frame.

Alternatively, when pcoo_update_flag is equal to 1, a frame index is signaled and the delta-coded position and orientation are measured with respect to the position and orientation of that frame.

In one example, delta coding is only applied to position values and not the orientation values.

pcoo_origin_info_present_flag equal to 1 specifies that the absolute position information of the SPS origin is signaled. pcoo_origin_info_present_flag equal to 0 specifies that the absolute position information of the point cloud frame is not signaled.

A default absolution may be chosen, or sent by external means in such cases.

pcoo_origin_coordinate_system_id specifies the coordinate system used to describe the absolute position of the SPS origin for the current frame. The value of pcoo_origin_coordinate_system_id shall be in the range of 0 to 2, for bitstream conforming to this version of the specification. The other values are reserved for future use by ISO/IEC.

pcoo_origin_coordinate_num_params specifies the number of parameters that are signaled for the position in the indicated coordinate system.

In some alternatives, the value of pcoo_origin_coordinate_numparams may be fixed and pre-determined based on the value of pcoo_origin_coordinate_system_id. In some alternatives, this syntax element may be coded as a _minusN, where values less than N are not allowed to be signaled.

pcoo_origin_coordinate_num_bits is used to specify the number of bits used to signal pcoo_origin_coordinate_val[i].

pcoo_origin_coordinate_val[i] for i=0 . . . . pcoo_origin_coordinate_numparams−1 is used to derive the position of the SPS origin for the current frame.

The interpretation of pcoo_origin_coordinate_val[ ] may be given by the following table:

| pcoo_origin_ coordinate_ system_id | Name | Reference position | pcoo_orgin_ coordinate_val[i] |
|---|---|---|---|
| 0 | ECEF | Earth's center | 0: displacement in X axis<br>1: displacement in Y axis<br>2: displacement in Z axis<br>(in units of $1/100^{th}$ of 1 m) |
| 1 | Geodetic | Earth's center | 0: latitude<br>1: longitude<br>2: elevation<br>(in units of $1/100^{th}$ of 1 m and in units of $1/10000^{th}$ of a degree) |
| 2 | ENU | Earth's center for local reference | 0: displacement in X axis<br>1: displacement in Y axis<br>2: displacement in Z axis<br>(in ECEF coordinates of the origin of the tangent plane)<br>3: local displacement in East-direction<br>4: local displacement in North-direction<br>5: local displacement in Up-direction<br>(All displacements in units of $1/100^{th}$ of a 1 m) |

Note that the above precision, and the precision in the rest of this disclosure, are just examples, and the techniques of this disclosure apply to any precision of meters, degrees, or other units.

In one example, for some systems, the number of parameters for the same system may vary based on the value of update_flag. For example, when update_flag equal to 0, ENU system may have six points and when update_flag is equal to 1, ENU system may have only three points which correspond to local displacements.

In another example, an option to signal a local reference may be allowed. The local reference may be signaled when a syntax element is signaled that indicates that a local reference is present (e.g., local reference_present_flag).

pcoo_orientation_info_present_flag equal to 1 specifies that the orientation of the XYZ axes of the point cloud frame is signaled. pcoo_orientation_info_present_flag equal to 0 specifies that orientation of the XYZ axes of the point cloud frame is not signaled.

pcoo_orientation_system_id specifies the orientation system used to describe the orientation of the XYZ axes of the point cloud frame. The value of pcoo_orientation_system_id shall be in the range of 0 to 1, for bitstreams conforming to this version of the specification. The other values are reserved for future use by ISO/IEC.

pcoo_orientation_coordinate_num_params specifies the number of parameters that are signaled for the orientation in the indicated coordinate system.

In some example, the value of pcoo_orientation_coordinate_num_params may be fixed and pre-determined based on the value of pcoo_orientation_coordinate_system_id. In some examples, this syntax element may be coded as a minusN, where values less than N are not allowed to be signaled.

pcoo_orientation_coordinate_num_bits is used to specify the number of bits used to signal pcoo_orientation_coordinate_val[i].

pcoo_orientation_coordinate_val[i] for i=1. pcoo_orientation_coordinate_numparams is used to determine the orientation XYZ axes of the point cloud frame.

The interpretation of the pcoo_orientation_coordinate_val may be obtained from the following table:

| pcoo_orientation_ coordinate_ system_id | Name | Reference orientation | Index of Pcoo_orientation_ coordinate_val[i] |
|---|---|---|---|
| 0 | — | Right-hand system with z aligned with ECEF z axis (earth center to north pole) | 0: roll<br>1: pitch<br>2: yaw<br>(in units of $1/10000^{th}$ of 1 degree)<br>Rotation from reference orientation to current orientation |
| 1 | | Right-hand system with z aligned with ECEF z axis (earth center to north pole) | 0-8: describing rotational matrix<br>(for N bits, absolute value of $1 \ll (N-2)$ denotes a value of 1 in the rotational matrix) |

In one example, at least one of pcoo_orientation_info_present_flag and pcoo_origin_info_present_flag is restricted to be equal to 1 in the syntax structure.

In some examples, the parameters of the indexed 0 to 8 correspond to the row-wise scanned elements of the rotational matrix (i.e., i-th index corresponds to (i/3)-rd row and (i %2)-th column. More generally, any scan pattern of the rotational matrix elements may be chosen to obtain the pcoo_orientation_coordinate_val[i] parameters.

Figure 9:
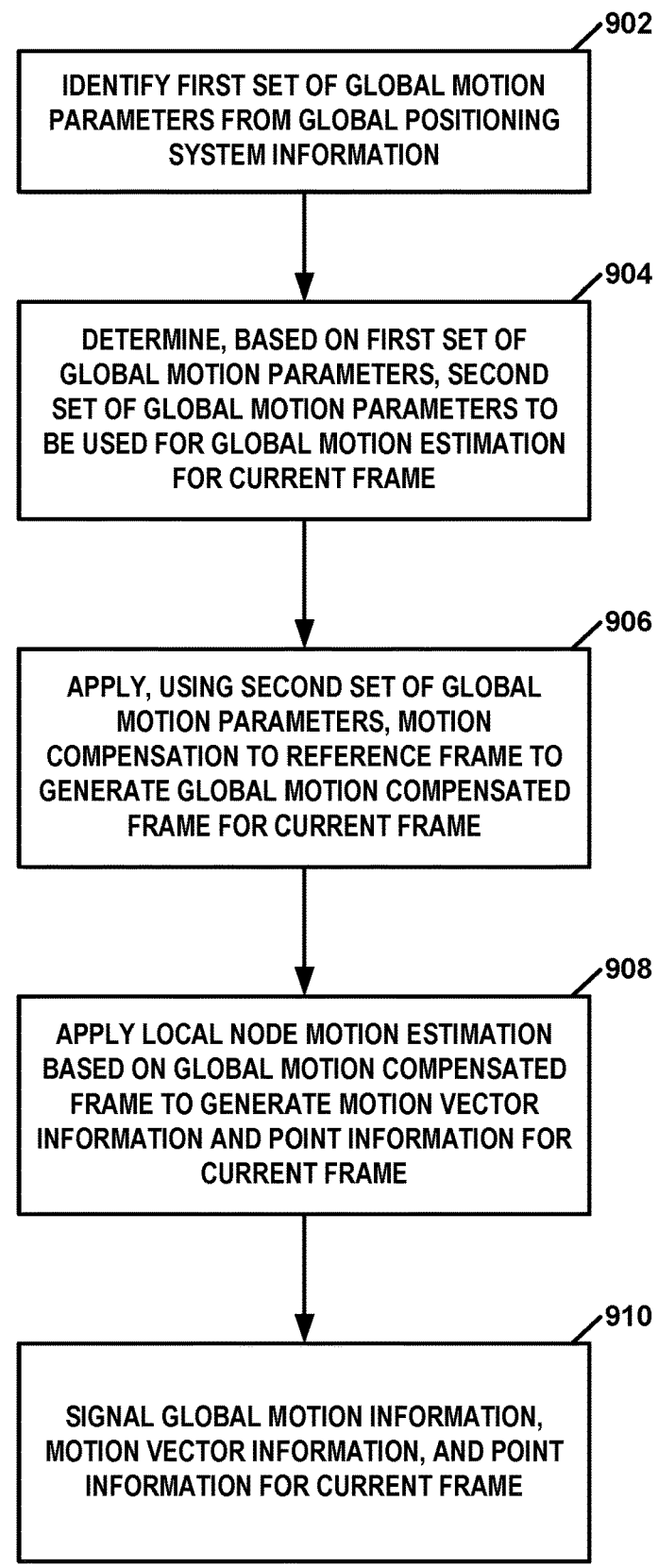
FIG. 9 is a flowchart illustrating an example encoding process, in accordance with the techniques of the disclosure.

FIG. 9 is a flowchart illustrating an example encoding process, in accordance with the techniques of the disclosure. G-PCC encoder 200 (e.g., octree analysis unit 210) may identify a first set of global motion parameters from global positioning system information (902). For example, G-PCC encoder 200 may identify a set of orientation parameters and/or a set of position parameters for a current frame from the global positioning system information.

G-PCC encoder 200 (e.g., octree analysis unit 210) may determine, based on the first set of global motion parameters, a second set of global motion parameters to be used for global motion estimation for a current frame (904). For example, G-PCC encoder 200 may determine a rotational matrix indicating a yaw, a pitch, and a roll for the current frame and a translation vector indicating an average velocity for the current frame.

G-PCC encoder 200 (e.g., octree analysis unit 210) may apply, based on the second set of global motion parameters, motion compensation to a reference frame to generate a global motion compensated frame for the current frame (906). For example, G-PCC encoder 200 (e.g., octree analysis unit 210) may apply global motion compensation on all the points in a reference frame (e.g., a prediction frame) based on the second set of global motion parameters (e.g., a rotational matrix and a translation vector). In this way, G-PCC encoder 200 may apply global motion compensation using satellite information, which may be more accurate than estimating the rotational matrix and translation vector for the current frame based on feature points between a reference frame (e.g., a prediction frame) and the current frame.

G-PCC encoder 200 (e.g., octree analysis unit 210) may apply local node motion estimation based on the global motion compensated frame to generate motion vector information and point information for the current frame (908). For example, G-PCC encoder 200 (e.g., octree analysis unit 210) may apply local node motion estimation. For example, G-PCC encoder 200 (e.g., octree analysis unit 210) may apply a brute force search within a current node. In this example, G-PCC encoder 200 (e.g., octree analysis unit 210) may sample a portion of points in the current node. G-PCC encoder 200 (e.g., octree analysis unit 210) may, given an initial motion vector, generate the compensated points and compute the cost between those points and their pairs in a reference node. G-PCC encoder 200 (e.g., octree analysis unit 210) may choose the motion vector that minimizes the cost as the final estimated local node motion vector.

G-PCC encoder 200 (e.g., arithmetic encoding unit 214) may signal global motion information, motion vector information, and point information for the current frame (910). For example, G-PCC encoder 200 (e.g., arithmetic encoding unit 214) may signal the first set of global motion parameters (e.g., a set of orientation parameters and/or a set of position parameters). In some examples, G-PCC encoder 200 (e.g., arithmetic encoding unit 214) may signal the second set of global motion parameters (e.g., a rotational matrix and a translation vector). G-PCC encoder 200 (e.g., arithmetic encoding unit 214) may signal a difference of roll between the current frame and a frame of reference, a difference of pitch between the current frame and the frame of reference, a difference of yaw between the current frame and the frame of reference and a translation vector indicating an average velocity of the current frame (e.g., 6 elements). In some examples, G-PCC encoder 200 (e.g., arithmetic encoding unit 214) may signal a translation vector indicating an average velocity of the current frame (e.g., 3 elements). G-PCC encoder 200 (e.g., arithmetic encoding unit 214) may signal an approximation of the translation vector to be $T_{appr}=[0, abs(T), 0]$ where abs( ) is the absolute function to compute the magnitude of translation vector T.

Figure 10:
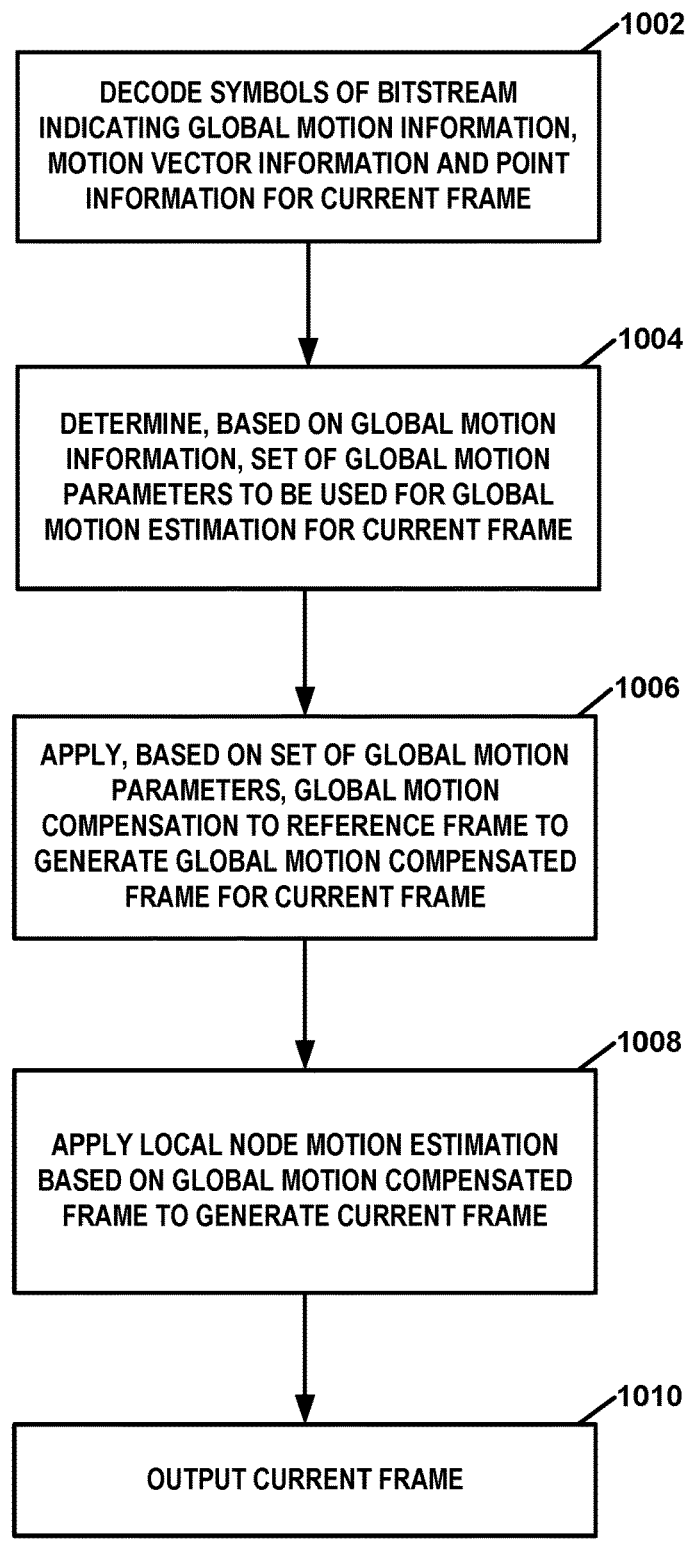
FIG. 10 is a flowchart illustrating an example decoding process, in accordance with the techniques of the disclosure.

FIG. 10 is a flowchart illustrating an example decoding process, in accordance with the techniques of the disclosure. G-PCC encoder 200 (e.g., geometric arithmetic decoding unit 302) may decode symbols of a bitstream indicating a global motion information, motion vector information, and point information for a current frame (1002).

For example, G-PCC decoder 300 (e.g., geometric arithmetic decoding unit 302) may decode the first set of global motion parameters and/or the second set of global motion parameters) from geometric bitstream 203. G-PCC decoder 300 (e.g., geometric arithmetic decoding unit 302) may decode a difference of roll between the current frame and a frame of reference, a difference of pitch between the current frame and the frame of reference, a difference of yaw between the current frame and the frame of reference and a translation vector indicating an average velocity of the current frame. In some examples, G-PCC decoder 300 (e.g., geometric arithmetic decoding unit 302) may decode a translation vector indicating an average velocity of the current frame. In some examples, G-PCC decoder 300 (e.g., geometric arithmetic decoding unit 302) may decode a magnitude of a translation vector indicating an average velocity of the current frame.

G-PCC decoder 300 (e.g., octree synthesis unit 306) may determine, based on the global motion information, a set of global motion parameters to be used for global motion estimation for a current frame (1004). For example, G-PCC decoder 300 (e.g., octree synthesis unit 306) may determine a rotational matrix and a translation vector based on a difference of roll, the difference of pitch, the difference of yaw and the translation vector. G-PCC decoder 300 (e.g., octree synthesis unit 306) may decode, from geometry bitstream 203, a translation vector and approximate the rotational matrix as an identity matrix. In some examples, G-PCC decoder 300 (e.g., octree synthesis unit 306) may decode, from geometry bitstream 203, a magnitude of a translation vector indicating an average velocity of the current frame. In this example, G-PCC decoder 300 (e.g., octree synthesis unit 306) may and approximate the translation vector based on the received magnitude and approximate the rotational matrix as an identity matrix.

G-PCC decoder 300 (e.g., octree synthesis unit 306) may apply, based on the set of global motion parameters, global motion compensation to a reference frame to generate a global motion compensated frame for a current frame (1006). In this way, G-PCC decoder 300 (e.g., octree synthesis unit 306) may apply global motion compensation using satellite information, which may be more accurate than estimating the rotational matrix and translation vector for the current frame based on feature points between a reference frame (e.g., a prediction frame) and the current frame.

G-PCC decoder 300 (e.g., octree synthesis unit 306) may apply local node motion estimation based on the global motion compensated frame to generate the current frame (1008). G-PCC decoder 300 may output the current frame (1012). For example, G-PCC decoder 300 may cause a display to output the current frame.

Examples in the various aspects of this disclosure may be used individually or in any combination.

Clause A1. A device for encoding point cloud data, the device comprising: a memory to store the point cloud data; and one or more processors coupled to the memory and implemented in circuitry, the one or more processors configured to: identify a first set of global motion parameters from global positioning system information; determine, based on the first set of global motion parameters, a second set of global motion parameters to be used for global motion estimation for a current frame; and apply, based on the second set of global motion parameters, motion compensation to a reference frame to generate a global motion compensated frame for the current frame.

Clause A2. The device of clause A1, wherein the one or more processors are configured to signal the second set of global motion parameters in a bitstream.

Clause A3. The device of clause A1, wherein the one or more processors are configured to signal the first set of global motion parameters in a bitstream.

Clause A4. The device of clause A1, wherein the first set of global motion parameters includes a set of orientation parameters.

Clause A5. The device of clause A4, wherein the set of orientation parameters comprises one or more of a roll, a pitch, a yaw, or an angular velocity for the current frame.

Clause A6. The device of clause A4, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

Clause A7. The device of clause A1, wherein the first set of global motion parameters includes a set of position parameters.

Clause A8. The device of clause A7, wherein the set of position parameters comprises one or more of a displacement for the current frame or an average velocity for the current frame.

Clause A9. The device of clause A7, wherein the set of position parameters comprises one or more of a velocity of east, a velocity of north, or a velocity of up of an East-North-Up coordinate system.

Clause A10. The device of clause A1, wherein the second set of global motion parameters comprises a rotational matrix indicating a yaw, a pitch, and a roll for the current frame and a translation vector indicating an average velocity for the current frame.

Clause A11. The device of clause A1, wherein the one or more processors are configured to signal a roll for the current frame, a pitch for the current frame, a yaw for the current frame, and a translation vector indicating an average velocity for the current frame.

Clause A12. The device of clause A1, wherein the one or more processors are configured to signal a difference of roll between the current frame and a frame of reference, a difference of pitch between the current frame and the frame of reference, a difference of yaw between the current frame and the frame of reference and a translation vector indicating an average velocity of the current frame.

Clause A13. The device of clause A1, wherein the one or more processors are configured to signal a translation vector indicating an average velocity of the current frame and refrain from signaling a rotational matrix indicating a yaw, a pitch, and a roll for the current frame.

Clause A14. The device of clause A1, wherein the one or more processors are configured to signal a magnitude of a translation vector indicating an average velocity of the current frame.

Clause A15. The device of clause A1, wherein the one or more processors are configured to perform motion vector estimation for the current frame based on the global motion compensated frame and wherein, to perform motion vector estimation, the one or more processors are configured to restrict a block size for local motion to be equal to a minimum prediction unit size.

Clause A16. The device of clause A1, wherein the reference frame is a first reference frame and the current frame is a first current frame and wherein the one or more processors are configured to estimate an initial translation vector by minimizing mean squared error between a second current frame and a second reference frame.

Clause A17. The device of clause A1, wherein the current frame is a first current frame and wherein the one or more processors are configured to: determine whether a point is ground or not; and estimate a rotational matrix for a second current frame based on whether the point is ground or not.

Clause A18. The device of clause A17, wherein the one or more processors are configured to signal a set of labels indicating whether the point is ground or not.

Clause A19. The device of clause A1, wherein the one or more processors are further configured to generate the point cloud data.

Clause A20. The device of clause A19, wherein the one or more processors are configured to, as part of generating the point cloud data, generate the point cloud data based on signals from a LIDAR apparatus.

Clause A21. The device of clause A1, wherein the device is one of a mobile phone, tablet computer, a vehicle, or an extended reality device.

Clause A22. The device of clause A1, wherein the device comprises an interface configured to transmit encoded point cloud data.

Clause A23. A method for encoding point cloud data, the method comprising: identifying, with one or more processors, a first set of global motion parameters from global positioning system information; determining, with one or more processors, based on the first set of global motion parameters, a second set of global motion parameters to be used for global motion estimation for a current frame; and applying, with one or more processors, based on the second set of global motion parameters, motion compensation to a reference frame to generate a global motion compensated frame for the current frame.

Clause A24. The method of clause A23, further comprising signaling, with the one or more processors, the second set of global motion parameters in a bitstream.

Clause A25. The method of clause A23, further comprising signaling, with the one or more processors, the first set of global motion parameters in a bitstream.

Clause A26. The method of clause A23, wherein the first set of global motion parameters includes a set of orientation parameters.

Clause A27. The method of clause A26, wherein the set of orientation parameters comprises one or more of a roll, a pitch, a yaw, or an angular velocity for the current frame.

Clause A28. The method of clause A26, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

Clause A29. The method of clause A23, wherein the first set of global motion parameters includes a set of position parameters.

Clause A30. The method of clause A29, wherein the set of position parameters comprises one or more of a displacement for the current frame or an average velocity for the current frame.

Clause A31. The method of clause A29, wherein the set of position parameters comprises one or more of a velocity of east, a velocity of north, or a velocity of up of an East-North-Up coordinate system.

Clause A32. The method of clause A23, wherein the second set of global motion parameters comprises a rotational matrix indicating a yaw, a pitch, and a roll for the current frame and a translation vector indicating an average velocity for the current frame.

Clause A33. The method of clause A23, further comprising signaling a roll for the current frame, a pitch for the current frame, a yaw for the current frame, and a translation vector indicating an average velocity for the current frame.

Clause A34. The method of clause A23, further comprising signaling a difference of roll between the current frame and a frame of reference, a difference of pitch between the current frame and the frame of reference, a difference of yaw between the current frame and the frame of reference and a translation vector indicating an average velocity of the current frame.

Clause A35. The method of clause A23, further comprising signaling, with the one or more processors, a translation vector indicating an average velocity of the current frame and refrain from signaling a rotational matrix indicating a yaw, a pitch, and a roll for the current frame.

Clause A36. The method of clause A23, further comprising signaling, with the one or more processors, a magnitude of a translation vector indicating an average velocity of the current frame.

Clause A37. The method of clause A23, further comprising performing, with the one or more processors, motion vector estimation for the current frame based on the global motion compensated frame and wherein performing motion vector estimation comprises restricting a block size for local motion to be equal to a minimum prediction unit size.

Clause A38. The method of clause A23, wherein the reference frame is a first reference frame and the current frame is a first current frame, the method further comprising estimating an initial translation vector by minimizing mean squared error between a second current frame and a second reference frame.

Clause A39. The method of clause A23, wherein the current frame is a first current frame, the method further comprising: determining, with the one or more processors, whether a point is ground or not; and estimating, with the one or more processors, a rotational matrix for a second current frame based on whether the point is ground or not.

Clause A40. The method of clause A39, further comprising signaling, with the one or more processors, a set of labels indicating whether the point is ground or not.

Clause A41. The method of clause A23, further comprising generating, with the one or more processors, the point cloud data.

Clause A42. The method of clause A41, further comprising generating, with the one or more processors, the point cloud data based on signals from a LIDAR apparatus.

Clause A43. A computer-readable storage medium having stored thereon instructions that, when executed, cause one or more processors to: identify a first set of global motion parameters from global positioning system information; determine, based on the first set of global motion parameters, a second set of global motion parameters to be used for global motion estimation for a current frame; and apply, based on the second set of global motion parameters, motion compensation to a reference frame to generate a global motion compensated frame for the current frame.

Clause B1. A device for encoding point cloud data, the device comprising: a memory to store the point cloud data; and one or more processors coupled to the memory and implemented in circuitry, the one or more processors configured to: identify a first set of global motion parameters from global positioning system information; determine, based on the first set of global motion parameters, a second set of global motion parameters to be used for global motion estimation for a current frame; and apply, based on the second set of global motion parameters, motion compensation to a reference frame to generate a global motion compensated frame for the current frame.

Clause B2. The device of clause B1, wherein the one or more processors are configured to signal the second set of global motion parameters in a bitstream.

Clause B3. The device of clause B1, wherein the one or more processors are configured to signal the first set of global motion parameters in a bitstream.

Clause B4. The device of any of clauses B1-B3, wherein the first set of global motion parameters includes a set of orientation parameters.

Clause B5. The device of clause B4, wherein the set of orientation parameters comprises one or more of a roll, a pitch, a yaw, or an angular velocity for the current frame.

Clause B6. The device of clause B4, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

Clause B7. The device of any of clauses B1-B6, wherein the first set of global motion parameters includes a set of position parameters.

Clause B8. The device of clause B7, wherein the set of position parameters comprises one or more of a displacement for the current frame or an average velocity for the current frame.

Clause B9. The device of clause B7, wherein the set of position parameters comprises one or more of a velocity of east, a velocity of north, or a velocity of up of an East-North-Up coordinate system.

Clause B10. The device of any of clauses B1-B9, wherein the second set of global motion parameters comprises a rotational matrix indicating a yaw, a pitch, and a roll for the current frame and a translation vector indicating an average velocity for the current frame.

Clause B11. The device of any of clauses B1, B4-B10, wherein the one or more processors are configured to signal a roll for the current frame, a pitch for the current frame, a yaw for the current frame, and a translation vector indicating an average velocity for the current frame.

Clause B12. The device of any of clauses B1, B4-B10, wherein the one or more processors are configured to signal a difference of roll between the current frame and a frame of reference, a difference of pitch between the current frame and the frame of reference, a difference of yaw between the current frame and the frame of reference and a translation vector indicating an average velocity of the current frame.

Clause B13. The device of any of clauses B1, B4-B10, wherein the one or more processors are configured to signal a translation vector indicating an average velocity of the current frame and refrain from signaling a rotational matrix indicating a yaw, a pitch, and a roll for the current frame.

Clause B14. The device of any of clauses B1, B4-B10, wherein the one or more processors are configured to signal a magnitude of a translation vector indicating an average velocity of the current frame.

Clause B15. The device of any of clauses B1-B14, wherein the one or more processors are configured to perform motion vector estimation for the current frame based on the global motion compensated frame and wherein, to perform motion vector estimation, the one or more processors are configured to restrict a block size for local motion to be equal to a minimum prediction unit size.

Clause B16. The device of any of clauses B1-B15, wherein the reference frame is a first reference frame and the current frame is a first current frame and wherein the one or more processors are configured to estimate an initial translation vector by minimizing mean squared error between a second current frame and a second reference frame.

Clause B17. The device of any of clauses B1-B15, wherein the current frame is a first current frame and wherein the one or more processors are configured to: determine whether a point is ground or not; and estimate a rotational matrix for a second current frame based on whether the point is ground or not.

Clause B18. The device of clause B17, wherein the one or more processors are configured to signal a set of labels indicating whether the point is ground or not.

Clause B19. The device of any of clauses B1-B18, wherein the one or more processors are further configured to generate the point cloud data.

Clause B20. The device of clause B19, wherein the one or more processors are configured to, as part of generating the point cloud data, generate the point cloud data based on signals from a LIDAR apparatus.

Clause B21. The device of any of clauses B1-B20, wherein the device is one of a mobile phone, tablet computer, a vehicle, or an extended reality device.

Clause B22. The device of any of clauses B1-B21, wherein the device comprises an interface configured to transmit encoded point cloud data.

Clause B23. A method for encoding point cloud data, the method comprising: identifying, with one or more processors, a first set of global motion parameters from global positioning system information; determining, with one or more processors, based on the first set of global motion parameters, a second set of global motion parameters to be used for global motion estimation for a current frame; and applying, with one or more processors, based on the second set of global motion parameters, motion compensation to a reference frame to generate a global motion compensated frame for the current frame.

Clause B24. The method of clause B23, further comprising signaling, with the one or more processors, the second set of global motion parameters in a bitstream.

Clause B25. The method of clause B23, further comprising signaling, with the one or more processors, the first set of global motion parameters in a bitstream.

Clause B26. The method of any of clauses B23-B25, wherein the first set of global motion parameters includes a set of orientation parameters.

Clause B27. The method of clause B26, wherein the set of orientation parameters comprises one or more of a roll, a pitch, a yaw, or an angular velocity for the current frame.

Clause B28. The method of clause B26, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

Clause B29. The method of any of clauses B23-28, wherein the first set of global motion parameters includes a set of position parameters.

Clause B30. The method of clause B29, wherein the set of position parameters comprises one or more of a displacement for the current frame or an average velocity for the current frame.

Clause B31. The method of clause B29, wherein the set of position parameters comprises one or more of a velocity of east, a velocity of north, or a velocity of up of an East-North-Up coordinate system.

Clause B32. The method of any of clauses B23-B31, wherein the second set of global motion parameters comprises a rotational matrix indicating a yaw, a pitch, and a roll for the current frame and a translation vector indicating an average velocity for the current frame.

Clause B33. The method of clause B23, further comprising signaling a roll for the current frame, a pitch for the current frame, a yaw for the current frame, and a translation vector indicating an average velocity for the current frame.

Clause B34. The method of any of clauses B23, B26-B33, further comprising signaling a difference of roll between the current frame and a frame of reference, a difference of pitch between the current frame and the frame of reference, a difference of yaw between the current frame and the frame of reference and a translation vector indicating an average velocity of the current frame.

Clause B35. The method of any of clauses B23, B26-B33, further comprising signaling, with the one or more processors, a translation vector indicating an average velocity of the current frame and refrain from signaling a rotational matrix indicating a yaw, a pitch, and a roll for the current frame.

Clause B36. The method of any of clauses B23, B26-B33, further comprising signaling, with the one or more processors, a magnitude of a translation vector indicating an average velocity of the current frame.

Clause B37. The method of any of clauses B23-B36, further comprising performing, with the one or more processors, motion vector estimation for the current frame based on the global motion compensated frame and wherein performing motion vector estimation comprises restricting a block size for local motion to be equal to a minimum prediction unit size.

Clause B38. The method of any of clauses B23-B37, wherein the reference frame is a first reference frame and the current frame is a first current frame, the method further comprising estimating an initial translation vector by minimizing mean squared error between a second current frame and a second reference frame.

Clause B39. The method of any of clauses B23-B37, wherein the current frame is a first current frame, the method further comprising: determining, with the one or more processors, whether a point is ground or not; and estimating, with the one or more processors, a rotational matrix for a second current frame based on whether the point is ground or not.

Clause B40. The method of clause B39, further comprising signaling, with the one or more processors, a set of labels indicating whether the point is ground or not.

Clause B41. The method of any of clauses B23-B40, further comprising generating, with the one or more processors, the point cloud data.

Clause B42. The method of clause B41, further comprising generating, with the one or more processors, the point cloud data based on signals from a LIDAR apparatus.

Clause B43. A computer-readable storage medium having stored thereon instructions that, when executed, cause one or more processors to: identify a first set of global motion parameters from global positioning system information;

determine, based on the first set of global motion parameters, a second set of global motion parameters to be used for global motion estimation for a current frame; and apply, based on the second set of global motion parameters, motion compensation to a reference frame to generate a global motion compensated frame for the current frame.

It is to be recognized that depending on the example, certain acts or events of any of the techniques described herein can be performed in a different sequence, may be added, merged, or left out altogether (e.g., not all described acts or events are necessary for the practice of the techniques). Moreover, in certain examples, acts or events may be performed concurrently, e.g., through multi-threaded processing, interrupt processing, or multiple processors, rather than sequentially.

In one or more examples, the functions described may be implemented in hardware, software, firmware, or any combination thereof. If implemented in software, the functions may be stored on or transmitted over as one or more instructions or code on a computer-readable medium and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more digital signal processors (DSPs), general purpose microprocessors, application specific integrated circuits (ASICs), field programmable gate arrays (FPGAs), or other equivalent integrated or discrete logic circuitry. Accordingly, the terms "processor" and "processing circuitry," as used herein may refer to any of the foregoing structures or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

What is claimed is:

1. A device for encoding point cloud data, the device comprising:
   a memory to store the point cloud data; and
   one or more processors coupled to the memory and implemented in circuitry, the one or more processors configured to:
   determine a first set of global motion parameters from global positioning system information;
   determine, based on the first set of global motion parameters, a second set of global motion parameters to be used for global motion estimation for a current frame of the point cloud data, wherein the second set of global motion parameters comprises a rotational matrix indicating a yaw, a pitch, and a roll for the current frame of the point cloud data and a translation vector indicating an average velocity for the current frame of the point cloud data;
   apply, based on the second set of global motion parameters, motion compensation to a reference frame to generate a global motion compensated reference frame for the current frame of the point cloud data;
   perform local node motion vector estimation to determine one or more motion vectors for the current frame of the point cloud data based on the global motion compensated reference frame and the current frame of the point cloud data, wherein to perform the local node motion vector estimation, the one or more processors are configured to restrict a maximum block size for the local node motion vector estimation to be equal to a minimum prediction unit size, wherein the maximum block size sets an upper bound node size for performing motion estimation and the minimum prediction unit size sets a lower bound node size for performing motion estimation; and
   generate a bitstream of encoded point cloud data, wherein the bitstream of encoded point cloud data includes one or more syntax elements indicating the one or more motion vectors and one or more syntax elements indicating the second set of global motion parameters.

2. The device of claim 1, wherein the one or more processors are configured to signal the second set of global motion parameters in a bitstream.

3. The device of claim 1, wherein the one or more processors are configured to signal the first set of global motion parameters in a bitstream.

4. The device of claim 1, wherein the first set of global motion parameters includes a set of orientation parameters.

5. The device of claim 4, wherein the set of orientation parameters comprises one or more of the roll, the pitch, the yaw, or an angular velocity for the current frame.

6. The device of claim 4, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

7. The device of claim 1, wherein the first set of global motion parameters includes a set of position parameters.

8. The device of claim 7, wherein the set of position parameters comprises one or more of a displacement for the current frame or an average velocity for the current frame.

9. The device of claim 7, wherein the set of position parameters comprises one or more of a velocity of east, a velocity of north, or a velocity of up of an East-North-Up coordinate system.

10. The device of claim 1, wherein the one or more processors are configured to signal a roll for the current frame, a pitch for the current frame, the yaw for the current frame, and the translation vector.

11. The device of claim 1, wherein the one or more processors are configured to signal a difference of roll between the current frame and a frame of reference, a difference of pitch between the current frame and the frame of reference, a difference of yaw between the current frame and the frame of reference and the translation vector.

12. The device of claim 1, wherein the one or more processors are configured to signal the translation vector indicating an average velocity of the current frame and refrain from signaling the rotational matrix.

13. The device of claim 1, wherein the one or more processors are configured to signal a magnitude of the translation vector.

14. The device of claim 1, wherein the reference frame is a first reference frame and the current frame is a first current frame and wherein the one or more processors are configured to estimate an initial translation vector by minimizing mean squared error between a second current frame and a second reference frame.

15. The device of claim 1, wherein the current frame is a first current frame and wherein the one or more processors are configured to:
determine whether a point is a ground point or not; and
estimate a rotational matrix for a second current frame based on the determination of whether the point is the ground point or not.

16. The device of claim 15, wherein the one or more processors are configured to signal a set of labels indicating whether the point is the ground point or not.

17. The device of claim 1, wherein the one or more processors are further configured to generate the point cloud data.

18. The device of claim 17, wherein the one or more processors are configured to, as part of generating the point cloud data, generate the point cloud data based on signals from a LIDAR apparatus.

19. The device of claim 1, wherein the device is one of a mobile phone, tablet computer, a vehicle, or an extended reality device.

20. A method for encoding point cloud data, the method comprising:
identifying, with one or more processors, a first set of global motion parameters from global positioning system information;
determining, with the one or more processors, based on the first set of global motion parameters, a second set of global motion parameters to be used for global motion estimation for a current frame of the point cloud data, wherein the second set of global motion parameters comprises a rotational matrix indicating a yaw, a pitch, and a roll for the current frame of the point cloud data and a translation vector indicating an average velocity for the current frame of the point cloud data;
applying, with the one or more processors, based on the second set of global motion parameters, motion compensation to a reference frame to generate a global motion compensated reference frame for the current frame of the point cloud data;
performing local node motion vector estimation to determine one or more motion vectors for the current frame of the point cloud data based on the global motion compensated reference frame and the current frame of the point cloud data, wherein performing the local node motion vector estimation comprises restricting a maximum block size for the local node motion vector estimation to be equal to a minimum prediction unit size, wherein the maximum block size sets an upper bound node size for performing motion estimation and the minimum prediction unit size sets a lower bound node size for performing motion estimation; and
generating, with the one or more processors, a bitstream of encoded point cloud data, wherein the bitstream of encoded point cloud data includes one or more syntax elements indicating the one or more motion vectors and one or more syntax elements indicating the second set of global motion parameters.

21. The method of claim 20, further comprising signaling, with the one or more processors, the second set of global motion parameters in a bitstream.

22. The method of claim 20, further comprising signaling, with the one or more processors, the first set of global motion parameters in a bitstream.

23. The method of claim 20, wherein the first set of global motion parameters includes a set of orientation parameters.

24. The method of claim 23, wherein the set of orientation parameters comprises one or more of the roll, the pitch, the yaw, or an angular velocity for the current frame.

25. The method of claim 23, wherein the set of orientation parameters comprise one or more of a difference of roll between the current frame and a frame of reference, a difference of pitch between the current frame and the frame of reference, a difference of yaw between the current frame and the frame, or a difference of angular velocity between the current frame and the frame of reference.

26. The method of claim 20, wherein the first set of global motion parameters includes a set of position parameters.

27. The method of claim 26, wherein the set of position parameters comprises one or more of a displacement for the current frame or an average velocity for the current frame.

28. The method of claim 26, wherein the set of position parameters comprises one or more of a velocity of east, a velocity of north, or a velocity of up of an East-North-Up coordinate system.

29. The method of claim 20, further comprising signaling the roll for the current frame, the pitch for the current frame, the yaw for the current frame, and the translation vector.

30. The method of claim 20, further comprising signaling a difference of roll between the current frame and a frame of reference, a difference of pitch between the current frame and the frame of reference, a difference of yaw between the current frame and the frame of reference and the translation vector.

31. The method of claim 20, further comprising signaling, with the one or more processors, the translation vector and refraining from signaling the rotational matrix indicating the yaw, the pitch, and the roll for the current frame.

32. The method of claim 20, further comprising signaling, with the one or more processors, a magnitude of the translation vector.

33. The method of claim 20, wherein the reference frame is a first reference frame and the current frame is a first current frame, the method further comprising estimating an initial translation vector by minimizing mean squared error between a second current frame and a second reference frame.

34. The method of claim 20, wherein the current frame is a first current frame, the method further comprising:
    determining, with the one or more processors, whether a point is a ground point or not; and
    estimating, with the one or more processors, a rotational matrix for a second current frame based on the determination of whether the point is the ground point or not.

35. The method of claim 34, further comprising signaling, with the one or more processors, a set of labels indicating whether the point is the ground point or not.

36. The method of claim 20, further comprising generating, with the one or more processors, the point cloud data.

37. The method of claim 36, further comprising generating, with the one or more processors, the point cloud data based on signals from a LIDAR apparatus.

38. A computer-readable storage medium having stored thereon instructions that, when executed, cause one or more processors to:
    identify a first set of global motion parameters from global positioning system information;
    determine, based on the first set of global motion parameters, a second set of global motion parameters to be used for global motion estimation for a current frame of point cloud data, wherein the second set of global motion parameters comprises a rotational matrix indicating a yaw, a pitch, and a roll for the current frame of the point cloud data and a translation vector indicating an average velocity for the current frame of the point cloud data;
    apply, based on the second set of global motion parameters, motion compensation to a reference frame to generate a global motion compensated reference frame for the current frame of the point cloud data;
    perform local node motion vector estimation to determine one or more motion vectors for the current frame of the point cloud data based on the global motion compensated reference frame and the current frame of the point cloud data, wherein, to perform the local node motion vector estimation, the instructions cause the one or more processors to restrict a maximum block size for the local node motion vector estimation to be equal to a minimum prediction unit size, wherein the maximum block size sets an upper bound node size for performing motion estimation and the minimum prediction unit size sets a lower bound node size for performing motion estimation; and
    generate a bitstream of encoded point cloud data, wherein the bitstream of encoded point cloud data includes one or more syntax elements indicating the one or more motion vectors and one or more syntax elements indicating the second set of global motion parameters.

39. The device of claim 1, wherein to perform the local node motion vector estimation, the one or more processors are configured to determines the one or more motion vectors based on a rate-distortion cost.

40. The device of claim 1, wherein the first set of global motion parameters comprises a set of orientation parameters including one or more of a roll, a pitch, or a yaw for the current frame, and a set of position parameters including a velocity for the current frame.

41. The device of claim 1, wherein to determine the second set of global motion parameters, the one or more processors are configured to derive the rotational matrix based on a difference of roll, a difference of pitch, and a difference of yaw between the current frame and the reference frame obtained from the global positioning system information.

42. The device of claim 1, wherein to determine the second set of global motion parameters, the one or more processors are configured to derive the translation vector based on a velocity from the global positioning system information, wherein the velocity is represented in an East-North-Up coordinate system.

* * * * *